US011563368B2

(12) United States Patent
Takahara et al.

(10) Patent No.: US 11,563,368 B2
(45) Date of Patent: Jan. 24, 2023

(54) POWER CONVERSION DEVICE

(71) Applicant: Mitsubishi Electric Corporation, Chiyoda-ku (JP)

(72) Inventors: Takaaki Takahara, Chiyoda-ku (JP); Hiroto Mizutani, Chiyoda-ku (JP); Ryota Kondo, Chiyoda-ku (JP); Satoshi Murakami, Chiyoda-ku (JP); Hiroyasu Iwabuki, Chiyoda-ku (JP); Kei Hayase, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 6 days.

(21) Appl. No.: 16/479,703

(22) PCT Filed: Oct. 20, 2017

(86) PCT No.: PCT/JP2017/037981
§ 371 (c)(1),
(2) Date: Jul. 22, 2019

(87) PCT Pub. No.: WO2018/185962
PCT Pub. Date: Oct. 11, 2018

(65) Prior Publication Data
US 2020/0266699 A1 Aug. 20, 2020

(30) Foreign Application Priority Data

Apr. 3, 2017 (JP) .............................. JP2017-073382

(51) Int. Cl.
*H02M 1/08* (2006.01)
*H02M 1/084* (2006.01)
(Continued)

(52) U.S. Cl.
CPC ........... *H02M 1/083* (2013.01); *H02M 1/084* (2013.01); *H02M 1/096* (2013.01); *H02M 1/38* (2013.01);
(Continued)

(58) Field of Classification Search
CPC ...... H02M 1/096; H02M 1/083; H02M 1/084; H02M 1/38; H02M 3/33523; H02M 3/337; H02M 2001/0058; H02M 2001/385
See application file for complete search history.

(56) References Cited

U.S. PATENT DOCUMENTS 9,257,851 B2 * 2/2016 Baarman ................. H02J 50/80
2008/0088268 A1 * 4/2008 Sakaguchi ............ F04D 27/004
318/471
(Continued)

FOREIGN PATENT DOCUMENTS

EP 2 575 247 A1 4/2013
JP 10-174205 A 6/1998
(Continued)

OTHER PUBLICATIONS

Extended European Search Report dated Mar. 11, 2020 in Eurpoean Patent Application No. 17904457.3, 9 pages.
(Continued)

*Primary Examiner* — Ryan Johnson
*Assistant Examiner* — Colleen J O Toole
(74) *Attorney, Agent, or Firm* — Xsensus LLP

(57) ABSTRACT

A period from when switching elements S1, S4 at first diagonal positions in a full-bridge inverter are turned off at the same time to when switching elements S2, S3 at second diagonal positions are turned on at the same time, is defined as T1, and a period from when the switching elements S2, S3 at the second diagonal positions are turned off at the same
(Continued)

time to when the switching elements S1, S4 at the first diagonal positions are turned on at the same time, is defined as T2. With a total length of T1 and T2 set to be constant, the lengths of T1 and T2 are controlled to be changed every switching cycle.

14 Claims, 18 Drawing Sheets

(51) Int. Cl.
      *H02M 1/096*      (2006.01)
      *H02M 1/38*       (2007.01)
      *H02M 3/335*      (2006.01)
      *H02M 1/00*       (2006.01)
      *H02M 3/00*       (2006.01)

(52) U.S. Cl.
      CPC ...... *H02M 3/33573* (2021.05); *H02M 1/0058* (2021.05); *H02M 3/01* (2021.05)

(56) References Cited

U.S. PATENT DOCUMENTS

2010/0220500 A1*   9/2010   Mino ................. H02M 3/3376
                                                                 363/17

2014/0028092 A1*   1/2014   Takeshima ......... H02M 3/3376
                                                                 307/10.1

FOREIGN PATENT DOCUMENTS

| JP | 2000-341801 A | 12/2000 |
|----|---------------|---------|
| JP | 2002-238257 A | 8/2002 |
| JP | 2004-40983 A | 2/2004 |
| JP | 2006-304383 A | 11/2006 |
| JP | 2011-101497 A | 5/2011 |
| JP | 5866614 B1 | 2/2016 |
| JP | 2016-144303 A | 8/2016 |
| JP | 2016-226225 A | 12/2016 |

OTHER PUBLICATIONS

International Search Report dated Dec. 26, 2017 in PCT/JP2017/037981 filed on Oct. 20, 2017.

Notification of Reasons for Refusal dated May 8, 2018 in Japanese Patent Application No. 2018-510145 (with English language translation).

European Office Action dated Apr. 15, 2021 in European Application No. 17904457.3.

Extended European search report dated Apr. 21, 2022, in corresponding European patent Application No. 17904457.3, 8 pages.

* cited by examiner

POWER CONVERSION DEVICE

TECHNICAL FIELD

The present invention relates to a power conversion device including a full-bridge inverter which converts DC voltage to high-frequency AC voltage and outputs the high-frequency AC voltage to a transformer, and a rectification circuit which rectifies output of the transformer.

BACKGROUND ART

In an isolation DC/DC converter having a full-bridge inverter and a rectification circuit in combination, when all switch elements are OFF, a resonance phenomenon occurs between a parasitic capacitance of each switch element, and a leakage inductance and a parasitic capacitance of a transformer. Turn-on voltage varies depending on the timing of turning on, and thus switching loss varies. Since a cooling device is designed at the maximum value of switching loss, the size of the cooling device is increased and the cost thereof is increased.

In order to solve the above problem, the following power conversion device is disclosed. A first OFF period is defined as a period in which all switching elements are OFF from when a switching element of an upper arm in a first series circuit and a switching element of a lower arm in a second series circuit are turned off to when a switching element of a lower arm in the first series circuit and a switching element of an upper arm in the second series circuit are turned on, and a second OFF period is defined as a period in which all switching elements are OFF from when the switching element of the lower arm in the first series circuit and the switching element of the upper arm in the second series circuit are turned off to when the switching element of the upper arm in the first series circuit and the switching element of the lower arm in the second series circuit are turned on. The first OFF period and the second OFF period are set to be different from each other, and the first OFF period and the second OFF period are adjusted so that turn-on operation is performed when the drain-source voltage of any of the switching elements reaches a local minimum (for example, Patent Document 1).

CITATION LIST

Patent Document

Patent Document 1: Japanese Laid-Open Patent Publication No. 2011-101497 (paragraphs [0016], [0021]-[0024], and FIGS. 1, 3)

SUMMARY OF THE INVENTION

Problems to be Solved by the Invention

Patent Document 1 discloses a technique of storing a controlled variable according to an input/output condition in a controller in advance. However, the controlled variable needs to be adapted to not only input/output voltage and current but also change in temperature condition, thus causing a problem that an enormous amount of controlled variables needs to be stored. Further, the resonant frequency of a resonance phenomenon occurring when all the switching elements are OFF is higher than a switching frequency. Therefore, there is a problem that, when a minute error has occurred in the controlled variable stored in advance, turn-on operation is performed at a point other than a local minimum point, leading to increase in switching loss.

The present invention has been made to solve the above problems, and aims to provide a small-sized power conversion device in which a controller and a cooling device are downsized by suppressing increase in switching loss by a simple control method.

Solution to the Problems

A first power conversion device according to the present invention includes: an inverter having a full-bridge configuration, in which a first leg and a second leg are connected in parallel and are each formed by connecting, in series, two switching elements forming an upper arm and a lower arm, the first leg and the second leg are connected in parallel to a DC power supply, and a connection point between the upper arm and the lower arm of the first leg and a connection point between the upper arm and the lower arm of the second leg serve as output terminals for AC voltage; a transformer having a primary side connected to the output terminals for the AC voltage; a rectification circuit connected to a secondary side of the transformer; and a control unit for turning on/off each of the switching elements. The control unit alternately provides a first power transmission period in which the switching element of the upper arm of the first leg and the switching element of the lower arm of the second leg in the inverter are turned on at the same time, and a second power transmission period in which the switching element of the lower arm of the first leg and the switching element of the upper arm of the second leg in the inverter are turned on at the same time. The control unit provides a first power non-transmission period in which all the switching elements are turned off, between the first power transmission period and the second power transmission period, and provides a second power non-transmission period in which all the switching elements are turned off, between the second power transmission period and the first power transmission period. The control unit performs control so as to change a length of the first power non-transmission period and a length of the second power non-transmission period every switching cycle, while setting a total length of the first power non-transmission period and the second power non-transmission period to be constant.

Effect of the Invention

In the power conversion device according to the present invention, the control unit performs control to change the lengths of the first power non-transmission period and the second power non-transmission period every switching cycle while setting the total length of the first power non-transmission period and the second power non-transmission period to be constant. Accordingly, increase in switching loss is suppressed by a simple control method, whereby a controller and a cooling device are downsized and thus a small-sized power conversion device can be provided.

DESCRIPTION OF EMBODIMENTS

Embodiment 1

Embodiment 1 describes a power conversion device including a full-bridge inverter, a transformer, a rectification circuit, and a control unit, wherein a period from when switching elements at first diagonal positions are turned off at the same time to when switching elements at second diagonal positions are turned on at the same time, is defined as T1 (first power non-transmission period), a period from when the switching elements at the second diagonal positions are turned off at the same time to when the switching elements at the first diagonal positions are turned on at the same time, is defined as T2 (second power non-transmission period), a period in which the switching elements at the first diagonal positions are turned on at the same time (first power transmission period) and a period in which the switching elements at the second diagonal positions are turned on at the same time (second power transmission period) are set to be equal to each other (Ton), the switching cycle is defined as Ts, and the Ton is set to be constant. Under this condition, the control unit repeats sweeping of T1 (first power non-transmission period) in a range from 0 to (Ts-2 Ton) at certain time intervals in respective switching cycles.

Figure 8:
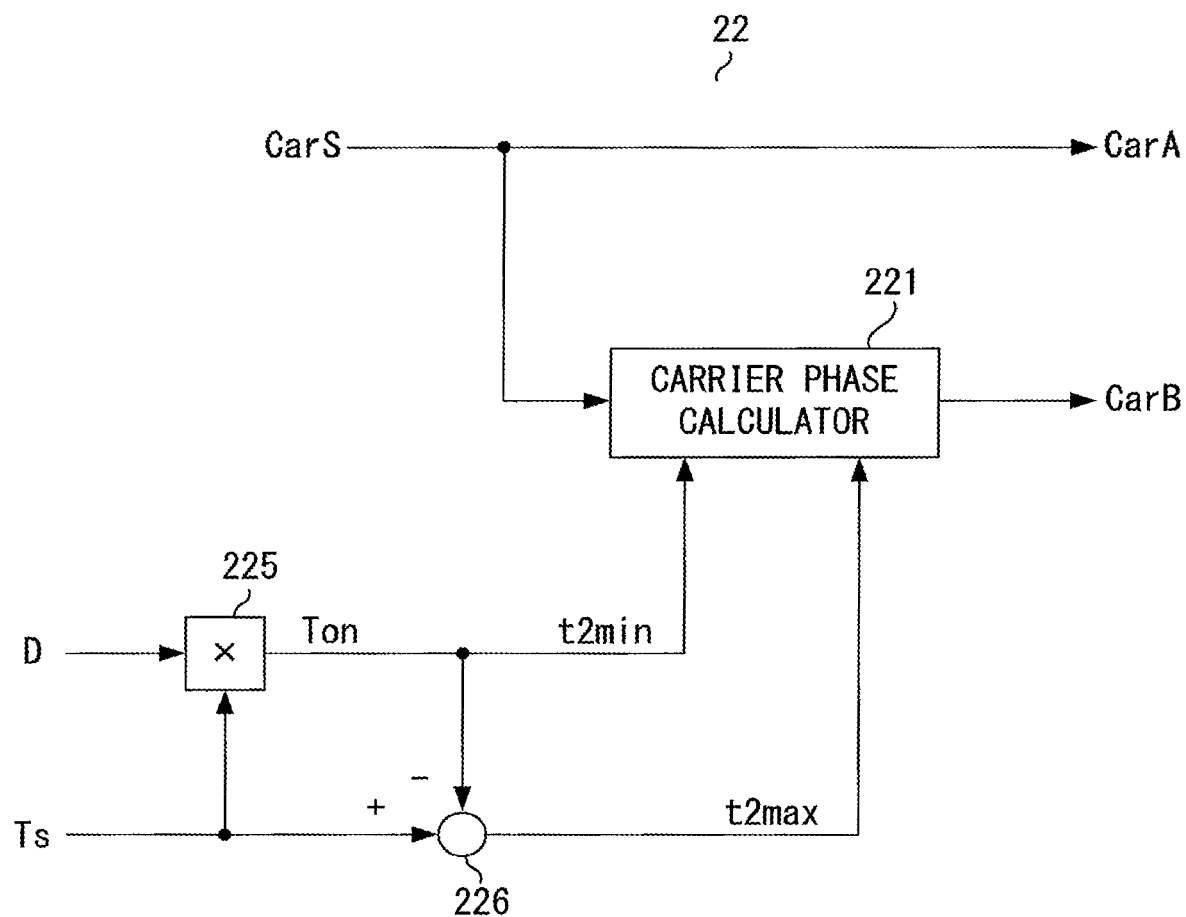
FIG. 8 is a block diagram showing the configuration of the control unit (turn-on phase calculator) in the power conversion device according to embodiment 1 of the present invention.
Figure 9:
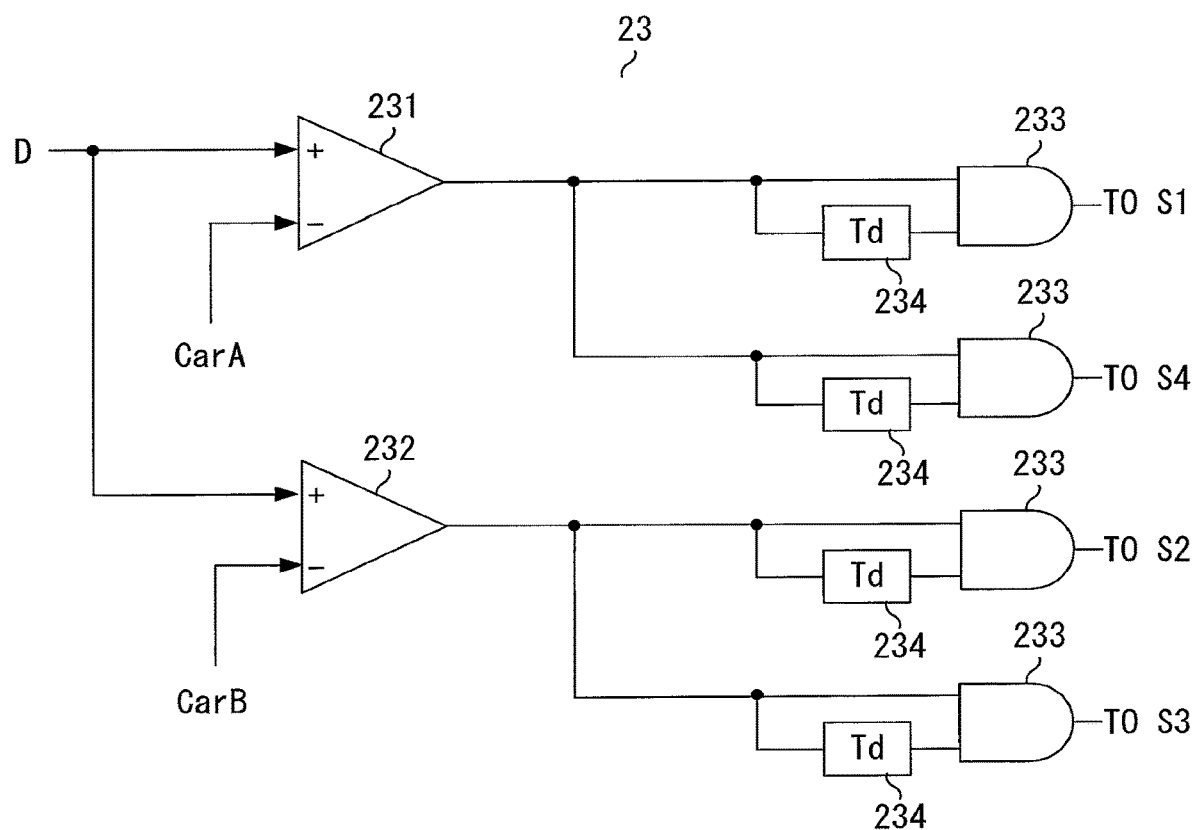
FIG. 9 is a block diagram showing the configuration of the control unit (PWM calculator) in the power conversion device according to embodiment 1 of the present invention.

Hereinafter, the configuration and operation of the power conversion device according to embodiment 1 will be described with reference to FIG. 1 which is a configuration diagram of the power conversion device, FIG. 2 to FIG. 4 which are time charts illustrating the operation, FIG. 5 to FIG. 7 which are block diagrams showing the configuration of the control unit (duty calculator), FIG. 8 which is a block diagram showing the configuration of the control unit (turn-on phase calculator), FIG. 9 which is a block diagram showing the configuration of the control unit (PWM calculator), and FIG. 10 which is a configuration diagram showing a modification of the power conversion device.

First, the configuration of the power conversion device according to embodiment 1 will be described with reference to FIG. 1.

It is noted that a DC power supply and a load are not elements constituting the power conversion device, but they are involved with operation of the power conversion device and therefore are described without being particularly separated from the power conversion device.

Figure 1:
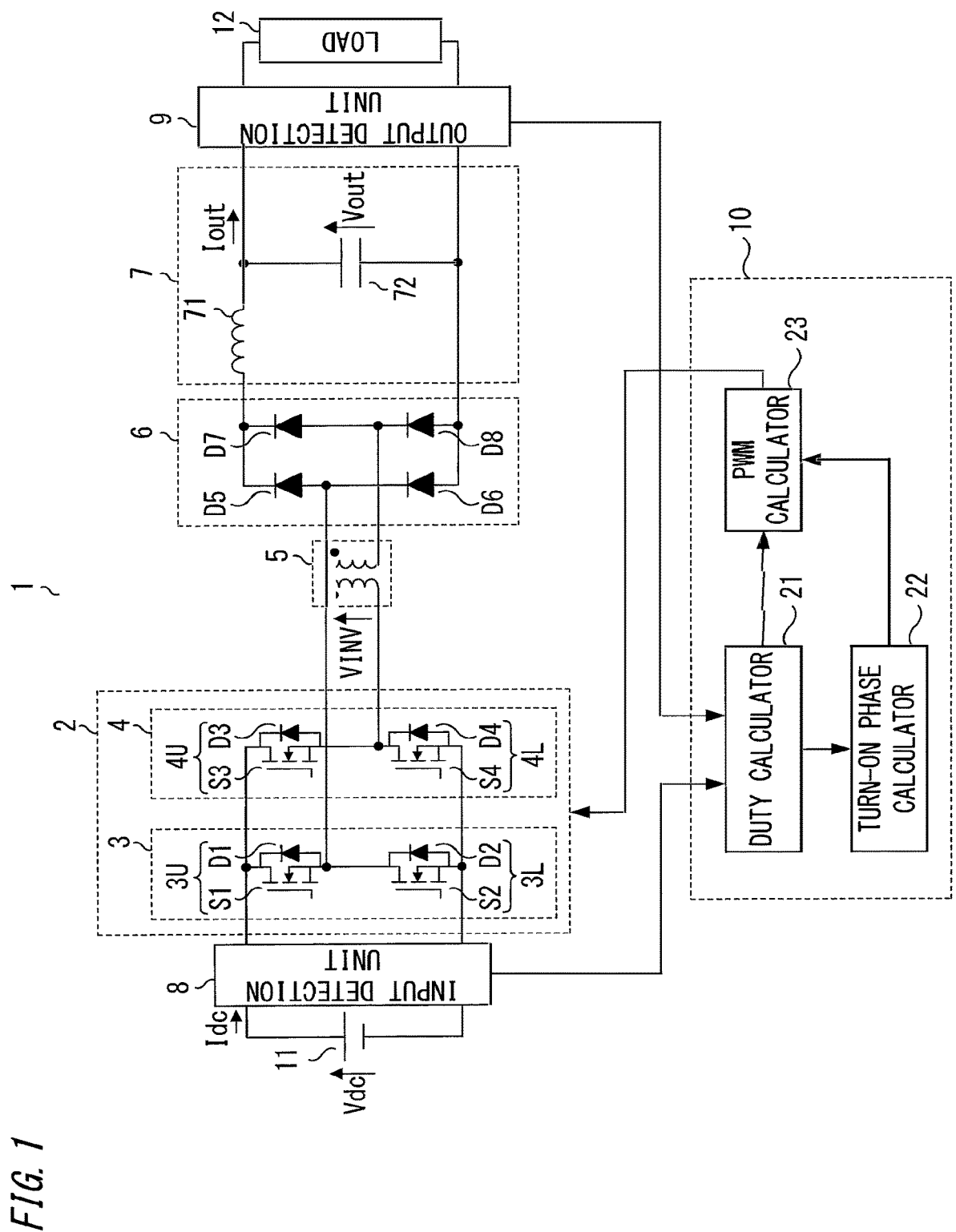
FIG. 1 is a configuration diagram of a power conversion device according to embodiment 1 of the present invention.

In FIG. 1, a power conversion device 1 is roughly composed of a power conversion unit and a detection/control unit.

The power conversion unit includes an inverter 2 having a full-bridge configuration, a transformer 5, a rectification circuit 6, and an output smoothing filter 7. A DC power supply 11 is connected to the input side of the inverter 2 of the power conversion unit, and a load 12 is connected to the output side of the output smoothing filter 7.

The detection/control unit includes an input detection unit 8, an output detection unit 9, and a control unit 10.

First, the entire function and operation of the power conversion unit will be described and thereafter, the configuration and function of each element will be described.

The inverter 2 converts DC voltage of the DC power supply 11 to high-frequency AC voltage, and outputs the high-frequency AC voltage to the transformer 5. The transformer 5 keeps isolation between the inverter 2 and the rectification circuit 6, and converts output voltage of the inverter 2 to high-frequency AC voltage having a predetermined peak value. The rectification circuit 6 rectifies the high-frequency AC voltage outputted from the transformer 5. The output smoothing filter 7 removes a high-frequency component of the voltage outputted from the rectification circuit 6, and supplies DC power to the load 12.

Next, the configuration of the inverter 2 will be described.

The inverter 2 having a full-bridge configuration is formed by connecting, in parallel, a first leg 3 and a second leg 4 each having switching elements connected in series.

The first leg 3 has an upper arm 3U and a lower arm 3L connected in series. The upper arm 3U has a switching element S1 and a feedback diode D1 connected in antiparallel to the switching element S1. The lower arm 3L has a switching element S2 and a feedback diode D2 connected in antiparallel to the switching element S2.

The second leg 4 has an upper arm 4U and a lower arm 4L connected in series. The upper arm 4U has a switching element S3 and a feedback diode D3 connected in antiparallel to the switching element S3. The lower arm 4L has a switching element S4 and a feedback diode D4 connected in antiparallel to the switching element S4.

An end portion of the upper arms 3U and 4U and an end portion of the lower arms 3L and 4L in the parallel circuit of the first leg 3 and the second leg 4 serve as a positive input terminal and a negative input terminal, respectively. Output voltage of the DC power supply 11 is applied between these input terminals. It is noted that the switching element S1 and the switching element S3 may be referred to as upper-arm-side switching elements, and the switching element S2 and the switching element S4 may be referred to as lower-arm-side switching elements.

The connection point between the upper arm 3U and the lower arm 3L of the first leg 3, and the connection point between the upper arm 4U and the lower arm 4L of the second leg 4, serve as output terminals of the inverter 2. Voltage (VINV) outputted at the output terminals of the inverter 2 is applied to a primary coil of the transformer 5.

The rectification circuit 6 composed of diodes D5, D6, D7, D8 is connected to a secondary coil of the transformer 5. The output smoothing filter 7 composed of an inductor 71 and a capacitor 72 is connected to output terminals of the rectification circuit 6. The load 12 is connected to output of the output smoothing filter 7.

As power control for an inverter having a full-bridge configuration, pulse width modulation (PWM) control (hard switching type) and phase shift control (soft switching type) are generally known. In the present embodiment, PWM control (hard switching type) is used.

As the switching elements S1 to S4, for example, insulated gate bipolar transistors (IGBT) to which diodes are connected in antiparallel, or metal oxide semiconductor field effect transistors (MOSFET) each having a diode connected between the source and the drain, are desirably used. As the feedback diodes D1 to D4, diodes included in IGBTs or MOSFETs may be used, or separate diodes may be provided externally.

Next, the configuration and function of the detection/control unit will be described.

The input detection unit 8 is provided in parallel to the DC power supply 11, and detects at least one of voltage Vdc and current Idc of the DC power supply 11. In addition, the output detection unit 9 is provided in parallel to the load 12, and detects at least one of voltage Vout and current Iout of the load 12.

The control unit 10 includes a duty calculator 21, a turn-on phase calculator 22, and a PWM calculator 23.

The functions of the duty calculator 21, the turn-on phase calculator 22, and the PWM calculator 23 will be described.

The duty calculator 21 calculates a duty D which is a ratio of an ON period length to a switching cycle, on the basis of the detection value of at least one of the input detection unit 8 and the output detection unit 9. The turn-on phase calculator 22 calculates a turn-on phase on the basis of the duty D calculated by the duty calculator 21. The PWM calculator 23 calculates gate signals for the switching elements S1 to S4 in accordance with the calculated duty D and the calculated turn-on phase.

It is noted that the duty D is defined as D=Ton/Ts and does not become 0.5 or greater.

For easing the understanding of the function and operation of the power conversion device 1 according to embodiment 1, a basic operation will be described with reference to the time chart in FIG. 2, and thereafter, operation of the power conversion device 1 will be described with reference to the time charts in FIG. 3 and FIG. 4.

First, with reference to FIG. 2, the basic operation of the inverter 2 will be described.

Figure 2:
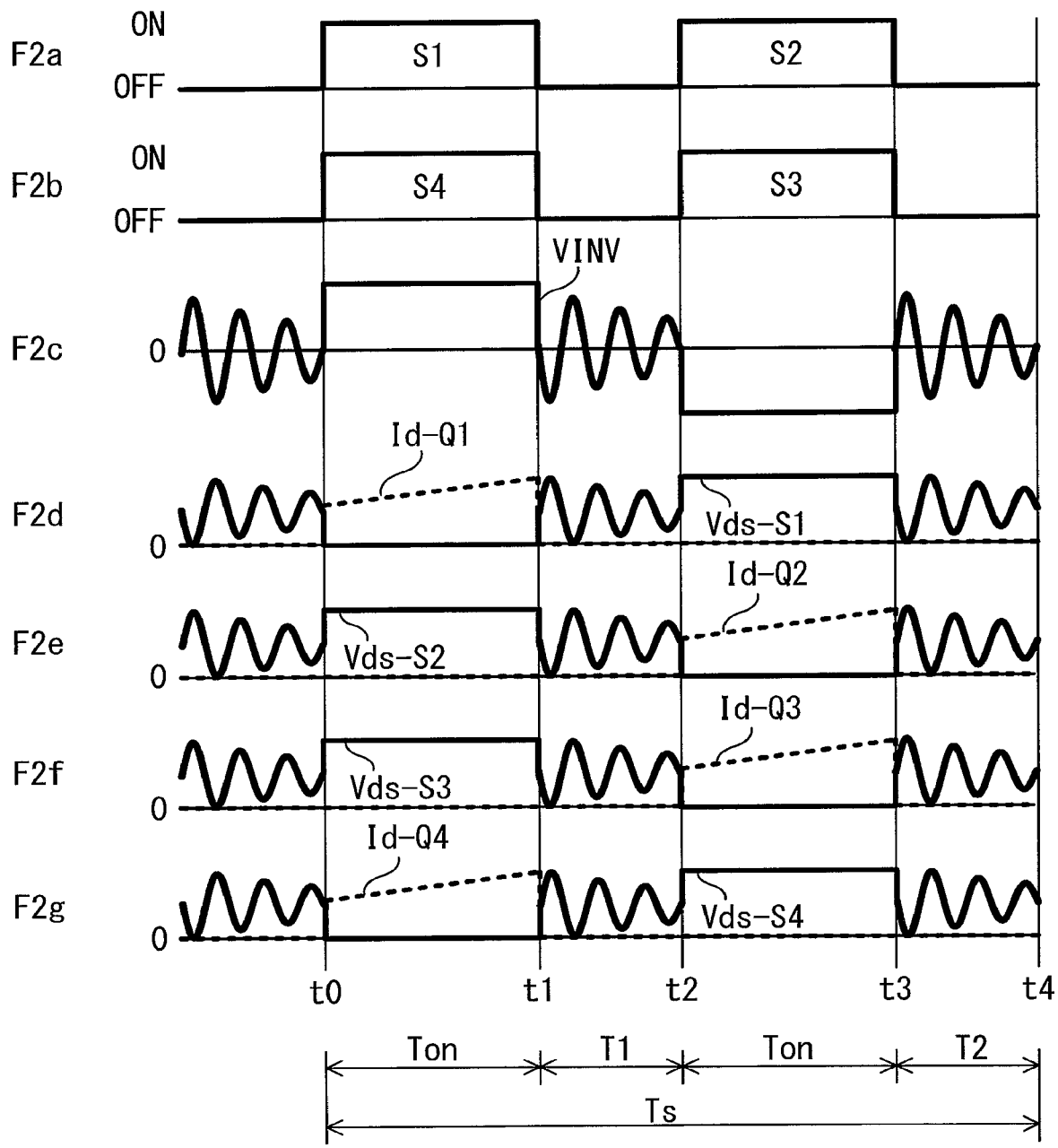
FIG. 2 is a time chart illustrating operation of the power conversion device according to embodiment 1 of the present invention.

FIG. 2 shows the time chart around one switching cycle. Here, it is assumed that MOSFETs are used as the switching elements composing the inverter 2 shown in FIG. 1.

F2a indicates a drive signal supplied to each of the gates of the switching elements S1, S2 in the first leg 3. F2b indicates a drive signal supplied to each of the gates of the switching elements S3, S4 in the second leg 4.

As shown by F2a and F2b, the upper-arm-side switching element and the lower-arm-side switching element in each leg are repeatedly turned on and off, alternately.

F2c indicates output voltage (VINV) of the inverter 2 which is voltage inputted to the transformer 5.

In F2d to F2g, the voltages across the terminals (drain-source voltages) Vds-S1, Vds-S2, Vds-S3, and Vds-S4 of the switching elements S1 to S4 are indicated by solid lines. Further, total currents Id-Q1, Id-Q2, Id-Q3, and Id-Q4 of currents flowing through the switching elements S1 to S4 and the feedback diodes D1 to D4 of the respective arms are indicated by broken lines.

In FIG. 2, t0 to t4 indicate times at which the switching elements S1 to S4 are switched from ON to OFF or from OFF to ON.

Vds indicates drain voltage of each switching element S1 to S4 with a source potential thereof as a reference, and Id indicates current of each switching element, where the direction of the current flowing inward from the drain is defined as positive.

A period from t0 to t4 is one switching cycle which is a repetitive cycle of PWM control, and the length thereof is defined as Ts. In addition, in order to suppress biased magnetization of the transformer 5, the length of a period from t0 to t1 and the length of a period from t2 to t3 are set to be equal to each other, and this period length is defined as Ton.

Further, a period from when the switching elements S1, S4 are turned off at the same time to when the switching elements S2, S3 are turned on at the same time (i.e., a period from t1 to t2) is defined as T1 (first power non-transmission period). In addition, a period from when the switching elements S2, S3 are turned off at the same time to when the switching elements S1, S4 are turned on at the same time (i.e., a period from t3 to t4) is defined as T2 (second power non-transmission period). In FIGS. 2, T1 and T2 are equal to each other.

A period from t0 to t1 may be referred to as a first power transmission period, and a period from t2 to t3 may be referred to as a second power transmission period.

Hereinafter, with reference to FIG. 2, operation of the inverter 2 will be described.

At time t0, from a state in which the switching elements S1 to S4 are OFF, the switching element S1 of the upper arm 3U of the first leg 3 and the switching element S4 of the lower arm of the second leg 4 are turned on.

At this time, the switching element S1 and the switching element S4 are turned on in a voltage applied state, whereby the drain-source voltages thereof are shifted to 0 V. Thus, hard switching is performed and switching loss occurs.

During a period from t0 to t1 (first power transmission period), output voltage (VINV) of the inverter 2 is outputted in a direction of an arrow in FIG. 1, and power is supplied to the load 12.

At time t1, the switching element S1 of the upper arm 3U of the first leg 3 and the switching element S4 of the lower arm 4L of the second leg 4 are turned off, so that all the switching elements S1 to S4 are OFF. At this time, voltage output from the inverter 2 is stopped.

In addition, at this time, the switching element S1 and the switching element S4 are turned off in a current conducting state, whereby the currents are interrupted. Thus, hard switching is performed and switching loss occurs.

Next, the period T1 (first power non-transmission period) from time t1 to time t2 will be described.

Ideally, the output voltage (VINV) of the inverter 2 is 0 V, and half of the voltage Vdc of the DC power supply 11 is applied as the drain-source voltage of each switching element S1 to S4. However, in the actual circuit, during this period, a resonance phenomenon occurs between a leakage inductance of the transformer 5, and a parasitic capacitance of the transformer 5 and parasitic capacitances of the switching elements S1 to S4, so that the output voltage (VINV) of the inverter 2 has a resonant voltage waveform.

Along with this, the voltage waveform between the drain and the source of each switching element S1 to S4 becomes a waveform in which the resonant voltage is superimposed on half of the voltage Vdc of the DC power supply 11. During this period, since the switching elements S1 to S4 are OFF, power is not supplied from the DC power supply 11, and power is transferred between the transformer 5 and the switching elements S1 to S4 by resonance.

At time t2, the switching element S2 of the lower arm 3L of the first leg 3 and the switching element S3 of the upper arm 4U of the second leg 4 are turned on.

At this time, the switching element S2 and the switching element S3 are turned on in a voltage applied state, whereby the drain-source voltages thereof are shifted to 0 V. Thus, hard switching is performed and switching loss occurs.

During a period from t2 to t3 (second power transmission period), the output voltage (VINV) of the inverter 2 is outputted in an opposite direction of the arrow in FIG. 1, and power is supplied to the load 12.

At time t3, the switching element S2 of the lower arm 3L of the first leg 3 and the switching element S3 of the upper arm 4U of the second leg 4 are turned off, so that all the switching elements S1 to S4 are OFF. At this time, voltage output from the inverter 2 is stopped.

In addition, at this time, the switching element S2 and the switching element S3 are turned off in a current conducting state, whereby the currents are interrupted. Thus, hard switching is performed and switching loss occurs.

Operation in the period T2 (second power non-transmission period) from time t3 to time t4 is the same as operation in the above period from time t1 to time t2. That is, the voltage waveform between the drain and the source of each switching element S1 to S4 becomes a waveform in which resonant voltage is superimposed on half of the voltage Vdc of the DC power supply 11. During this period, since the switching elements S1 to S4 are OFF, power is not supplied from the DC power supply 11, and power is transferred between the transformer 5 and the switching elements S1 to S4 by resonance.

After time t4, the operation described above is repeated. That is, time t4 in FIG. 2 will be replaced with time to.

Here, switching loss in turn-on operation at times t0 and t2 is proportional to the drain-source voltage immediately before the turn-on operation. Therefore, the switching loss varies depending on the phase of the resonant voltage. For example, as compared to the case where switching is performed when resonant voltage in an ideal state is Vdc/2, turn-on loss decreases if switching is performed at a local minimum point of the resonant voltage, and turn-on loss increases if switching is performed at a local maximum point of the resonant voltage.

In designing a radiator such as a heatsink, the size of a cooling device is determined so as to allow heat dissipation under a maximum loss condition. Therefore, it is necessary to design a cooling device in consideration of the maximum value of switching loss that varies. Thus, the size of the cooling device is increased, leading to a problem such as apparatus size increase and cost increase.

Next, operation of the power conversion device 1 of embodiment 1 of the present application, specifically, operation of the inverter 2, will be described with reference to the time charts in FIG. 3 and FIG. 4. It is noted that F3a to F3g in FIG. 3 correspond to F2a to F2g in FIG. 2. In addition, F4a to F4g in FIG. 4 correspond to F2a to F2g in FIG. 2.

In the power conversion device 1 according to embodiment 1, the switching elements S1 to S4 are turned on/off in accordance with the following conditions. (1) The switching cycle Ts is constant. (2) The ON period Ton is constant. (3) The switching elements S1 and S4 are turned on or turned off at the same time, and the switching elements S2 and S3 are turned on or turned off at the same time. (4) The timings of turning on the switching elements S1 to S4, i.e., the turn-on phases, are changed in the switching cycle Ts.

Under the above conditions, a state is provided in which T1 (first power non-transmission period) and T2 (second power non-transmission period) are set to be different from each other, and while the turn-on voltage varies, the turn-on phase is changed every switching cycle so that the turn-on voltage is averaged through a plurality of switching cycles.

Figure 3:
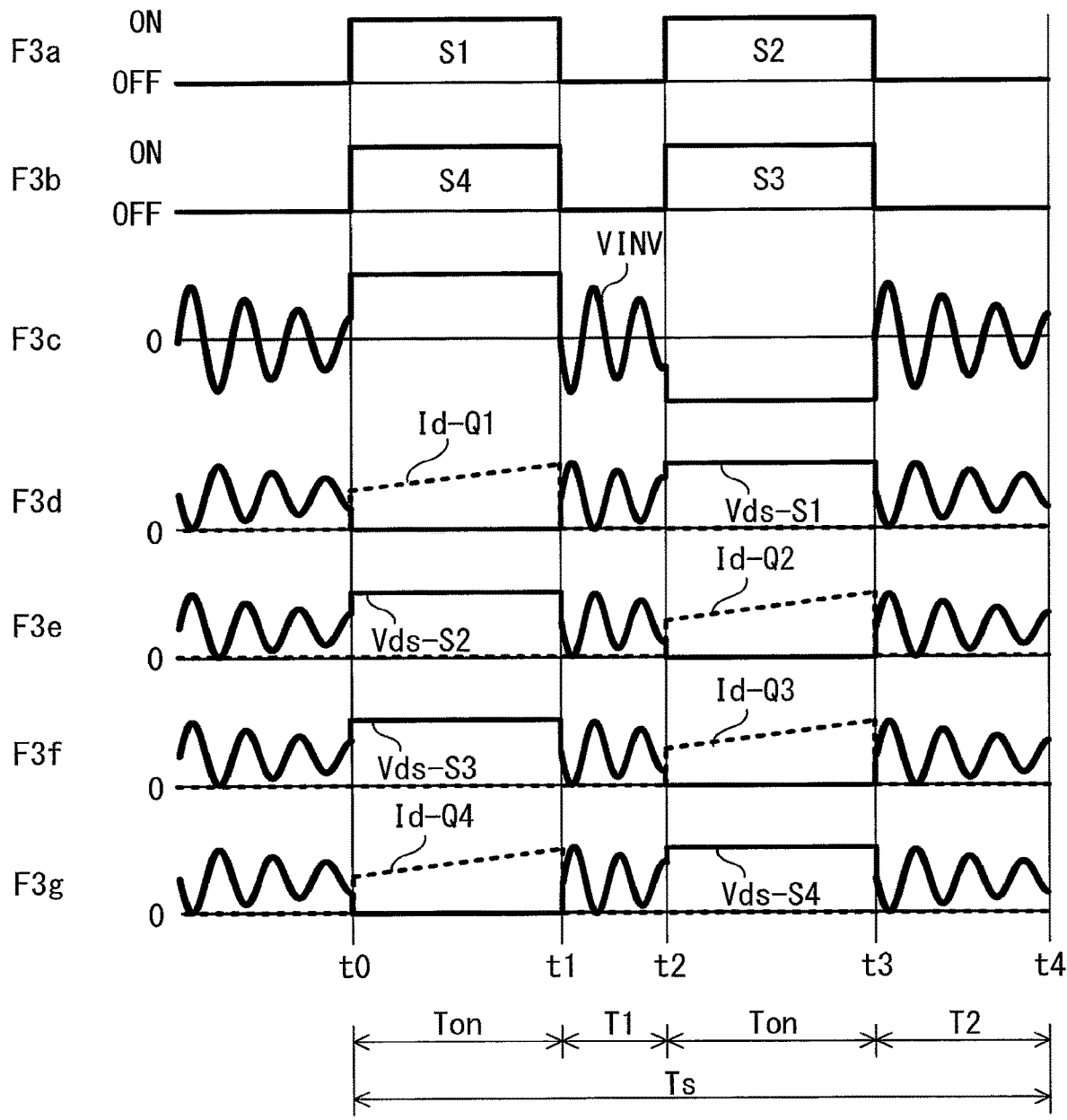
FIG. 3 is a time chart illustrating operation of the power conversion device according to embodiment 1 of the present invention.
Figure 4:
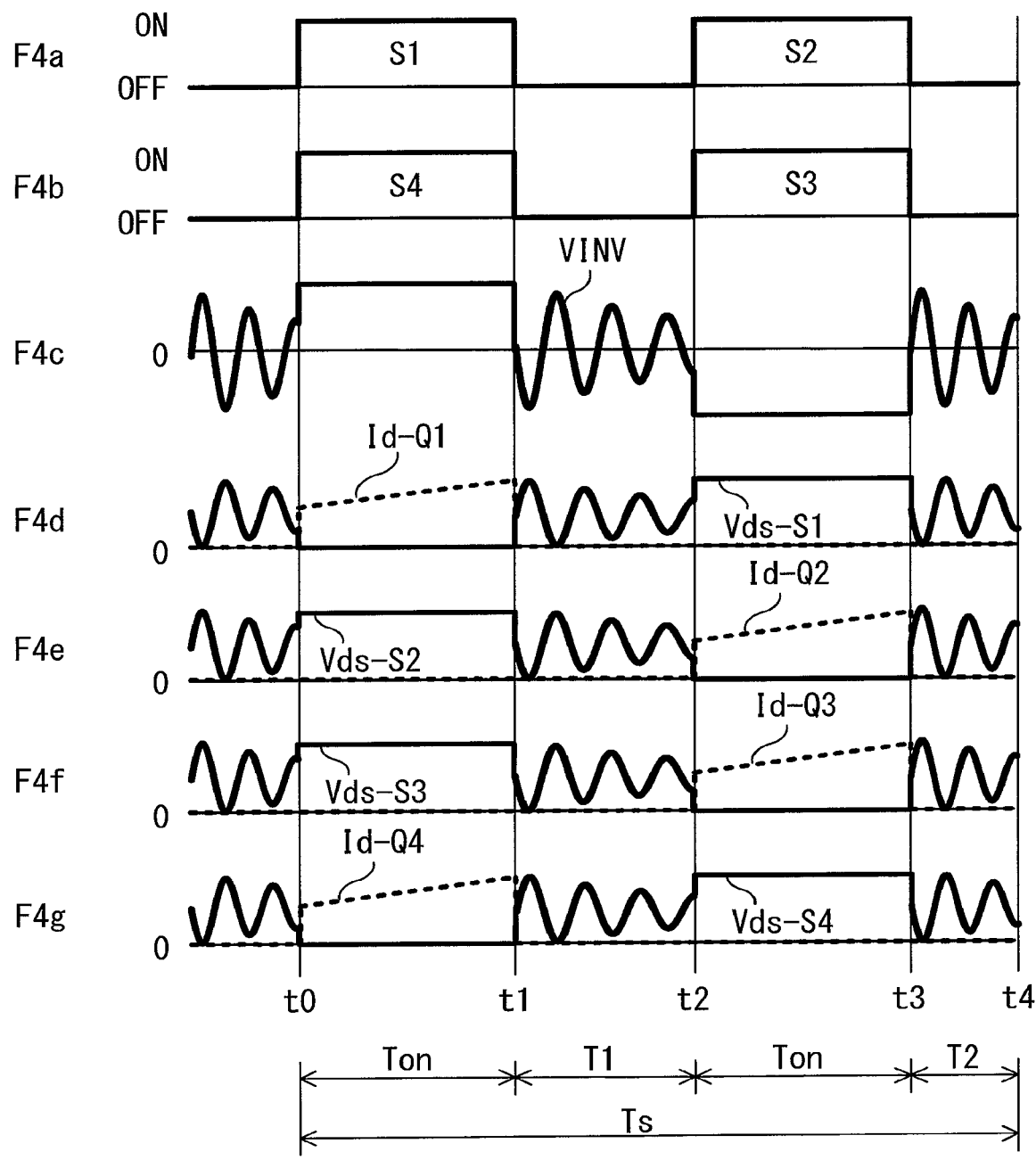
FIG. 4 is a time chart illustrating operation of the power conversion device according to embodiment 1 of the present invention.

FIG. 3 and FIG. 4 show time charts corresponding to respective switching patterns of the power conversion device 1 according to the present embodiment 1. FIG. 3 shows the case where T1 (first power non-transmission period) is set to be shorter than T2 (second power non-transmission period). FIG. 4 shows the case where T1 (first power non-transmission period) is set to be longer than T2 (second power non-transmission period).

Turn-on operations of the switching elements S1 to S4 will be compared between FIG. 2 in which T1 (first power non-transmission period) and T2 (second power non-transmission period) are equal to each other, and FIG. 3 and FIG. 4 in which T1 and T2 are different from each other. In FIG. 3 and FIG. 4, the length of T1 (first power non-transmission period) is changed, whereby the turn-on phase is changed, so that the turn-on voltage is changed.

That is, by making T1 and T2 different from each other, it is possible to reduce the drain-source voltages of the switching elements S1, S4 at time t0 or the switching elements S2, S3 at time t2, as compared to the case where T1 and T2 are equal to each other.

In the power conversion device 1 according to the present embodiment 1, since the switching cycle Ts is set to be constant and the ON period Ton of the switching elements S1 to S4 is set to be constant, the turn-on phase is changed within a predetermined turn-on phase range. For example, in FIG. 3 and FIG. 4, the turn-on phase range, i.e., the possible range of T1 (first power non-transmission period) (range in which T1 can be changed) is 0 to (Ts-2 Ton).

However, in actuality, for the case of T1=0 or T1=(Ts-2 Ton), a dead time is considered. For example, the initial value of time t2 is set at a time obtained by adding a dead time to time t1.

Within the turn-on phase range, the turn-on phase is advanced or delayed by a predetermined unit time every switching cycle.

As an example, the case where a state in which the length of T1 (first power non-transmission period) and the length of T2 (second power non-transmission period) are equal to each other as shown in FIG. 2 is set as an initial state and the turn-on phase is changed within the maximum turn-on phase range, will be described.

It is noted that, as described above, Ts is constant, Ton is constant, Ts=2 Ton+T1+T2 is satisfied, and (T1+T2) is constant. Here, for easing the description, Tref is defined as Tref=T1+T2.

From the state in which the length of T1 (first power non-transmission period) and the length of T2 (second power non-transmission period) are equal to each other as shown in FIG. 2, in the next switching cycle, t2 is advanced by the predetermined unit time and T1 is shortened accordingly. T2 is shortened by the length by which T1 is shortened.

In the next switching cycle, t2 is further advanced by the predetermined unit time. Thus, operation of advancing t2 is repeated every switching cycle until T1=0 (t1=t2) is satisfied.

In the switching cycle next to the switching cycle in which T1=0 (t1=t2) is satisfied, the length of T1 is prolonged by the predetermined unit time (t2 is delayed). Operation of delaying t2 is repeated every switching cycle until T1=(Ts-2 Ton) (i.e., t3=t4) is satisfied.

In the switching cycle next to the switching cycle in which T1=(Ts-2 Ton) (i.e., t3=t4) is satisfied, t2 is advanced by the predetermined unit time.

Through repetition of the above operation, the turn-on phase is changed within the predetermined turn phase range, whereby the turn-on voltages of the switching elements S1 to S4 can be averaged through the plurality of switching cycles.

It is noted that the predetermined unit time is set to be shorter than the cycle of the waveform of resonant voltage between the drain and the source of each switching element S1 to S4, which occurs during T1 (first power non-transmission period) and T2 (second power non-transmission period) as described above.

In the above description, the case of starting from the state of T1=T2 in FIG. 2 has been described for easing the understanding. However, the following operation may be performed.

Under the condition that Ts is constant, Ton is constant, Ts=2 Ton+T1+T2 is satisfied, and Tref (=T1+T2) is constant, the start phase of T1 (first power non-transmission period) is controlled so that T1 (first power non-transmission period) is increased from 0 to (Ts-2 Ton) and then is decreased from (Ts-2 Ton) to 0. Hereafter, such phase control is repeated, whereby the turn-on voltages of the switching elements S1 to S4 can be averaged through a plurality of switching cycles.

In considering a dead time, T1 (first power non-transmission period) is increased from the length of the dead time to the length of (Ts-2 Ton-dead time), and then is decreased to the length of the dead time.

Alternatively, the start phase of T2 (second power non-transmission period) may be controlled so that T2 (second power non-transmission period) is increased from 0 to (Ts-2 Ton) and then is decreased from (Ts-2 Ton) to 0, and hereafter, such phase control may be repeated. Also in this case, the same effect can be provided.

In considering a dead time, T2 (second power non-transmission period) is increased from the length of the dead time to the length of (Ts-2 Ton-dead time), and then is decreased to the length of the dead time.

Next, the functions and operations of the duty calculator 21, the turn-on phase calculator 22, and the PWM calculator 23 of the control unit 10 will be described with reference to FIG. 5 to FIG. 9.

First, the duty calculator 21 will be described.

The duty calculator 21 calculates a duty D on the basis of outputs from the input detection unit 8 and the output detection unit 9. It is noted that examples of the duty calculator 21 in FIG. 5 to FIG. 7 are discriminated as 21A to 21C because detection signals for calculating the duty D are different thereamong.

Figure 5:
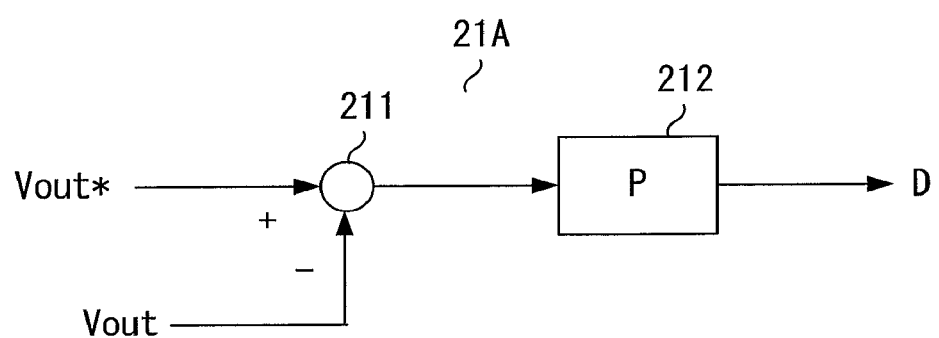
FIG. 5 is a block diagram showing the configuration of a control unit (duty calculator) in the power conversion device according to embodiment 1 of the present invention.

FIG. 5 shows a block diagram of a duty calculator 21A. The duty calculator 21A includes an adder/subtractor 211 and a proportional controller 212.

A deviation between a voltage detection value Vout of the output detection unit 9 and a predetermined load voltage target value Vout* is subjected to proportional (P) control, thereby calculating the duty D.

Figure 6:
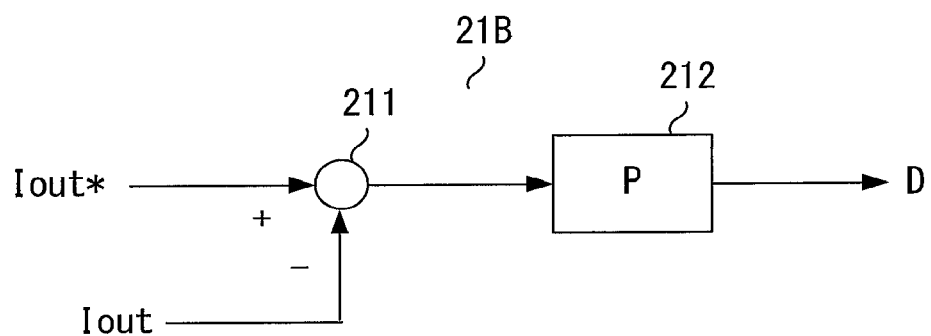
FIG. 6 is a block diagram showing the configuration of the control unit (duty calculator) in the power conversion device according to embodiment 1 of the present invention.

As another example of the duty calculator 21, FIG. 6 shows a block diagram of a duty calculator 21B. The duty calculator 21B includes an adder/subtractor 211 and a proportional controller 212.

The duty D is calculated on the basis of a deviation between a current detection value Iout of the output detection unit 9 and a load current target value Iout*.

Figure 7:
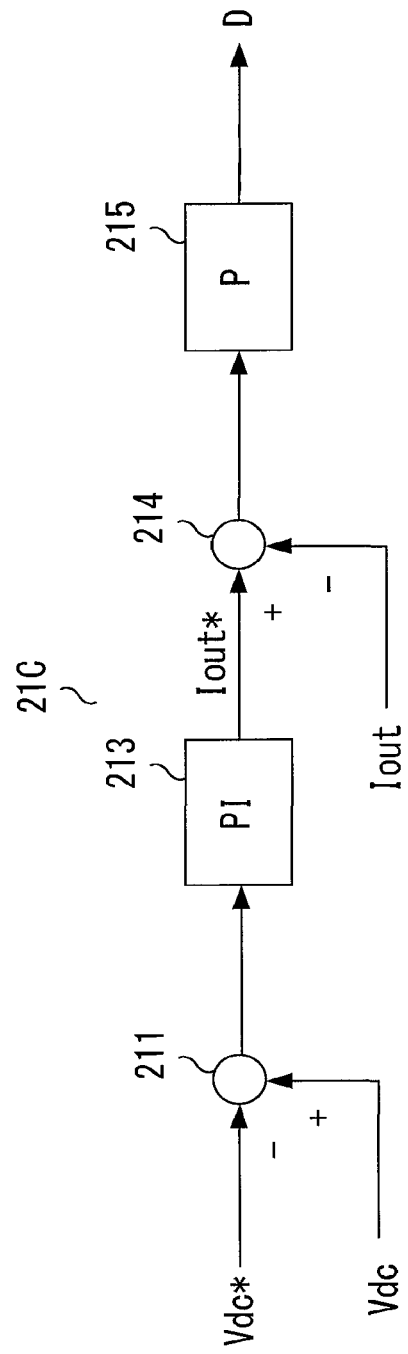
FIG. 7 is a block diagram showing the configuration of the control unit (duty calculator) in the power conversion device according to embodiment 1 of the present invention.

As still another example of the duty calculator 21, FIG. 7 shows a block diagram of a duty calculator 21C. The duty calculator 21C includes adder/subtractors 211, 214, a proportional integral controller 213, and a proportional controller 215.

When the DC power supply 11 is a current source such as an AC/DC converter, a deviation between a voltage detection value Vdc of the input detection unit 8 and a power supply voltage target value Vdc* is subjected to proportional integral control, thereby calculating a load current target value Iout*. The duty D is calculated on the basis of a deviation between the calculated load current target value Iout* and a current detection value Iout of the output detection unit 9.

Similarly, the duty D may be calculated on the basis of current Idc of the DC power supply 11 which is a detection value of the input detection unit 8 and a DC power supply current target value Idc*. Which detection value should be used for calculating the duty D may be determined on the basis of what type of load the load 12 is.

For example, if the load requires constant current, the duty D may be determined on the basis of the current detection value of the output detection unit 9, and if the load requires constant voltage, the duty D may be determined on the basis of the voltage detection value of the output detection unit 9.

Next, the turn-on phase calculator 22 will be described. FIG. 8 shows a block diagram of the turn-on phase calculator 22. The turn-on phase calculator 22 includes a carrier phase calculator 221, a multiplier 225, and an adder/subtractor 226.

On the basis of the calculation result from the duty calculator 21 and the switching cycle Ts, the turn-on phase range is calculated, and then a carrier CarA synchronized with a reference carrier CarS, and a carrier CarB having a phase difference from the reference carrier CarS within the turn-on phase range, are calculated.

The carrier phase calculator 221 provides the phase difference from the reference carrier CarS, to the carrier CarB.

For example, in changing time t2, the multiplier 225 calculates Ton, i.e., a minimum value (t2min) of t2, on the basis of the duty D which is the calculation result from the duty calculator 21 and the switching cycle Ts. Further, the adder/subtractor 226 calculates a maximum value (t2max) of t2. Thus, the turn-on phase range is calculated.

The carrier phase calculator 221 changes the turn-on phase within the calculated turn-on phase range (t2min to t2max) every switching cycle.

Specifically, the phase of the carrier CarB is advanced or delayed by the predetermined unit time every switching cycle, whereby the turn-on phase is controlled.

Next, the PWM calculator 23 will be described. FIG. 9 shows a block diagram of an example of the PWM calculator 23. The PWM calculator 23 includes comparators 231, 232, AND gates 233, and delay devices 234.

The PWM calculator 23 calculates and generates PWM signals for the gates of the switching elements S1 to S4 on the basis of the duty D which is the calculation result from the duty calculator 21 and the carriers CarA, CarB which are the calculation result from the turn-on phase calculator 22. The carrier CarA and the carrier CarB are inputted to the comparators 231, 232 respectively so as to be compared with the duty D, whereby pulse waveforms are generated.

On the basis of the output from the comparator 231, the PWM signals to be outputted to the switching elements S1, S4 are generated using the AND gates 233 and the delay devices 234.

On the basis of the output from the comparator 232, the PWM signals to be outputted to the switching elements S2, S3 are generated using the AND gates 233 and the delay devices 234.

By providing the delay devices 234 for calculating the dead time Td, the PWM signals for the switching elements S1 to S4 are generated with a predetermined dead time Td provided thereto.

In the power conversion device 1 according to the present embodiment 1, the voltage at the time of turning on is averaged through a plurality of switching cycles. Therefore, it is not necessary to perform adjustment in consideration of individual variations in the leakage inductance and the parasitic capacitance of the transformer and the parasitic capacitances of the switching elements.

Next, as a modification of the power conversion device 1 according to the present embodiment 1, a power conversion device 1A which is different in the configurations of the transformer 5 and the rectification circuit 6 will be described with reference to FIG. 10.

Figure 10:
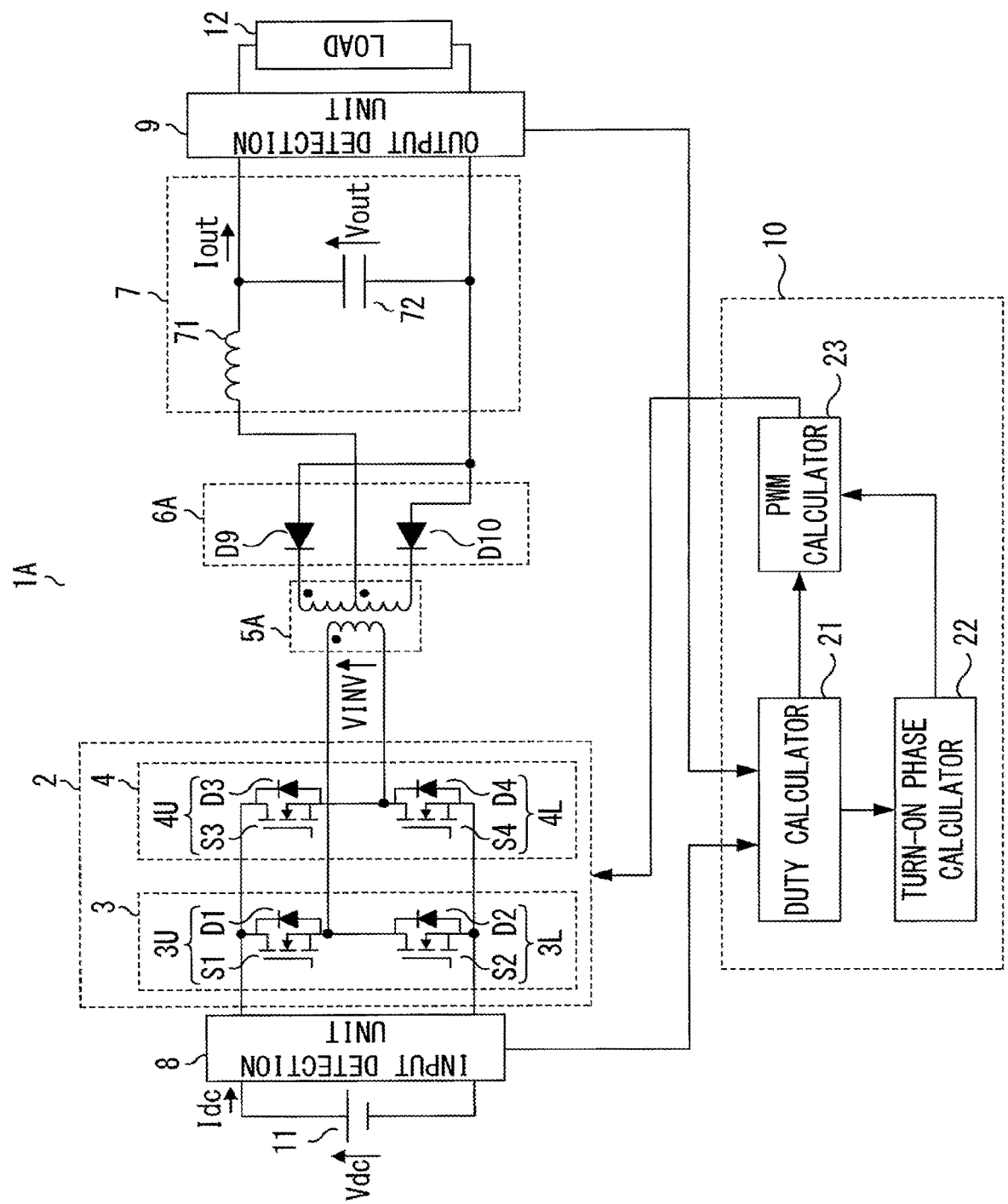
FIG. 10 is a configuration diagram showing a modification of the power conversion device according to embodiment 1 of the present invention.

In FIG. 10, differences from the power conversion device 1 in FIG. 1 are the configurations of the transformer 5A and the rectification circuit 6A. The transformer 5A has a center-tap configuration in which a center point is provided to the secondary winding of the transformer, and the rectification circuit 6A is composed of diodes D9 and D10.

Also in the power conversion device 1A shown in FIG. 10, for example, the start phase of T1 (first power non-transmission period) described above is controlled so that T1 is increased from 0 to (Ts-2 Ton) and then is decreased from (Ts-2 Ton) to 0. Hereafter, such phase control is repeated, whereby the turn-on voltages of the switching elements S1 to S4 can be averaged through a plurality of switching cycles.

In the above description, the rectification circuit 6 (6A) and the output smoothing filter 7 have been described as separate components. However, the components of the output smoothing filter may be incorporated into the rectification circuit so that the entirety is integrated in the rectification circuit.

In the above description, the lengths of the first power transmission period and the second power transmission period are set to be equal to each other. However, for example, when, due to presence of ripple in the input voltage or difference in impedances of the circuits, the amplitude during the first power transmission period and the amplitude during the second power transmission period are different from each other so that biased magnetization occurs in the transformer 5A, the lengths of the first power transmission period and the second power transmission period may be set to be different from each other.

As described above, in the power conversion device 1 according to embodiment 1, the turn-on voltages of the switching elements S1 to S4 can be averaged through a plurality of switching cycles. In general, the thermal time constant of the cooling device is greater than the switching cycle. Therefore, loss in the switching elements is averaged and the maximum loss that should be considered in designing the cooling device can be suppressed. As a result, the controller and the cooling device are downsized, whereby a small-sized power conversion device can be realized.

As described above, in the power conversion device according to embodiment 1, a period from when the switching elements at the first diagonal positions in the full-bridge inverter are turned off at the same time to when the switching elements at the second diagonal positions are turned on at the same time is defined as T1 (first power non-transmission period), a period from when the switching elements at the second diagonal positions are turned off at the same time to when the switching elements at the first diagonal positions are turned on at the same time is defined as T2 (second power non-transmission period), a period (first power transmission period) during which the switching elements at the first diagonal positions are turned on at the same time and a period (second power transmission period) during which the switching elements at the second diagonal positions are turned on at the same time are set to be equal to each other (Ton), and the switching cycle Ts and Ton are constant. Under this condition, the control unit repeats sweeping of T1 (first power non-transmission period) in a range from 0 to (Ts-2 Ton) at certain time intervals in respective switching cycles. Thus, the turn-on voltages of the switching elements can be averaged through a plurality of switching cycles. As a result, in the power conversion device according to embodiment 1, increase in switching loss is suppressed by a simple control method, whereby the controller and the cooling device can be downsized and thus a small-sized power conversion device can be provided.

Embodiment 2

In the power conversion device according to embodiment 1, sweeping of T1 (first power non-transmission period) is performed in a range from 0 to (Ts-2 Ton), whereby the turn-on voltages of the switching elements are averaged. On the other hand, in a power conversion device according to the present embodiment 2, a temperature detection unit for switching elements is provided, and on the basis of temperature detection values about the switching elements, the turn-on phase for the switching elements is changed to search for a point where the temperatures of the switching elements are minimized, thereby searching for the turn-on phase for the switching elements that minimizes turn-on loss in the switching elements.

Figure 11:
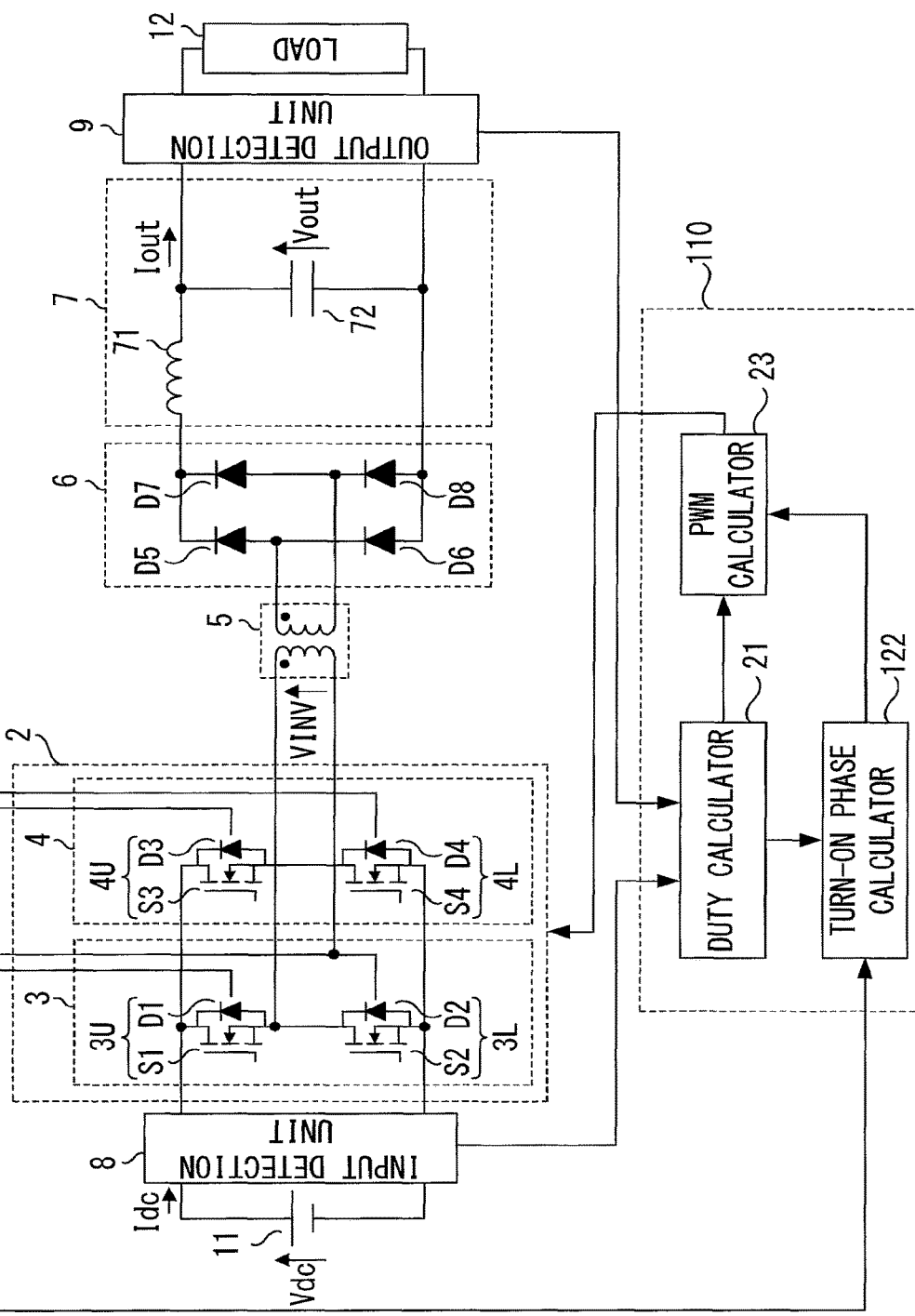
FIG. 11 is a configuration diagram of a power conversion device according to embodiment 2 of the present invention.
Figure 12:
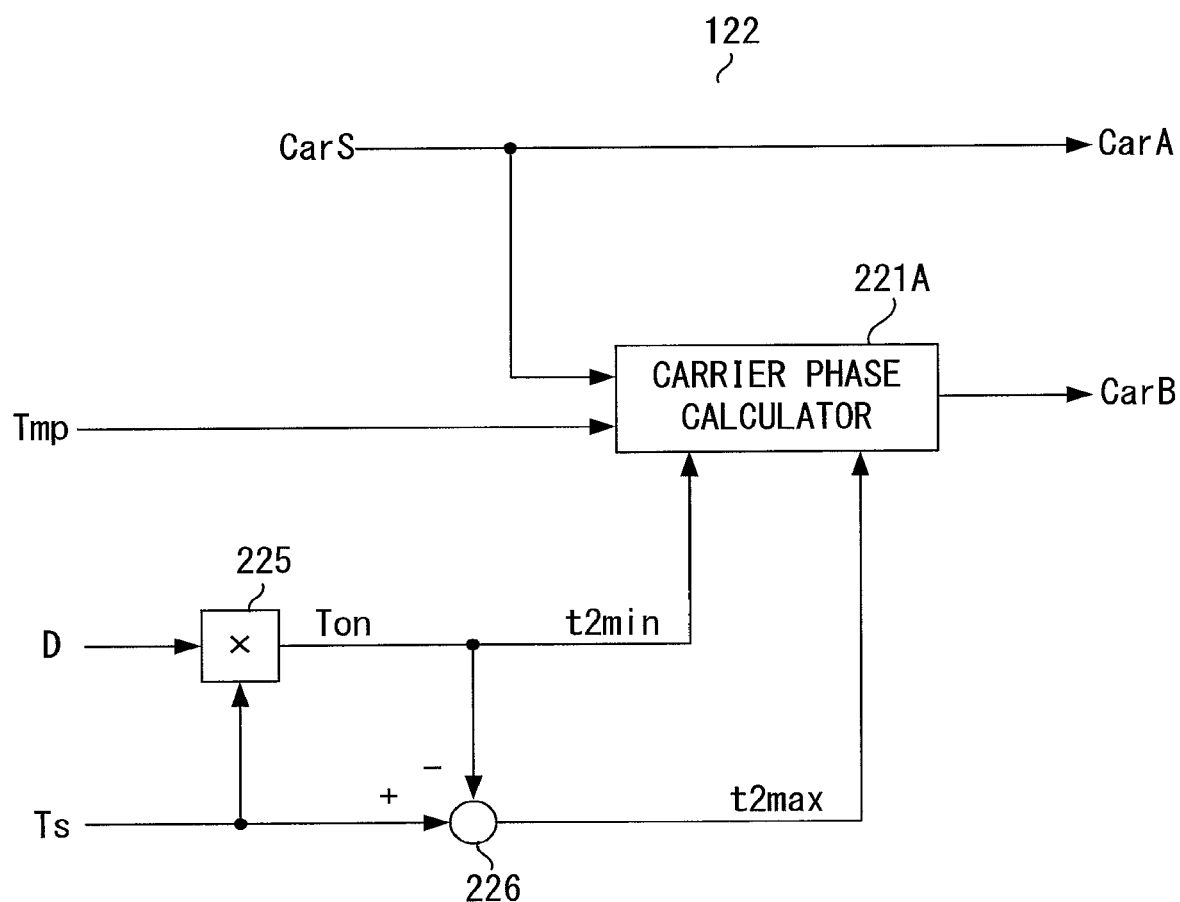
FIG. 12 is a block diagram showing the configuration of a control unit (turn-on phase calculator) in the power conversion device according to embodiment 2 of the present invention.

Hereinafter, the power conversion device according to embodiment 2 will be described, focusing on differences from embodiment 1, with reference to FIG. 11 which is a configuration diagram of the power conversion device and FIG. 12 which is a block diagram showing the configuration of the control unit (turn-on phase calculator). In FIG. 11, parts that are the same as or correspond to those in FIG. 1 in embodiment 1 are denoted by the same reference characters.

First, the configuration of a power conversion device 100 according to embodiment 2 will be described with reference to FIG. 11.

In FIG. 11, the power conversion device 100 is roughly composed of a power conversion unit and a detection/control unit.

The power conversion unit includes the inverter 2 having a full-bridge configuration, the transformer 5, the rectification circuit 6, and the output smoothing filter 7. The DC power supply 11 is connected to the input side of the inverter 2 of the power conversion unit, and the load 12 is connected to the output side of the output smoothing filter 7.

The detection/control unit includes the input detection unit 8, the output detection unit 9, a temperature detection unit 130, and a control unit 110.

First, the entire function and operation of the power conversion unit will be described.

The inverter 2 converts DC voltage of the DC power supply 11 to high-frequency AC voltage, and outputs the high-frequency AC voltage to the transformer 5. The transformer 5 keeps isolation between the inverter 2 and the rectification circuit 6, and performs conversion to predetermined high-frequency AC voltage. The rectification circuit 6 rectifies the high-frequency AC voltage outputted from the transformer 5. The output smoothing filter 7 removes a high-frequency component of the voltage outputted from the rectification circuit 6, and supplies DC power to the load 12.

In embodiment 2, the configuration of the inverter 2 of the power conversion unit in the power conversion device 100 is the same as that in embodiment 1.

Differences from embodiment 1, i.e., differences in operation of the inverter 2 of the power conversion unit and differences in the configuration and operation of the detection/control unit in the power conversion device 100, will be mainly described.

The power conversion device 100 according to embodiment 2 includes the input detection unit 8, the output detection unit 9, and the temperature detection unit 130 as detection units.

As in embodiment 1, in the power conversion device 100, the input detection unit 8 is provided in parallel to the DC power supply 11, and detects at least one of voltage Vdc and current Idc of the DC power supply 11. In addition, the output detection unit 9 is provided in parallel to the load 12, and detects at least one of voltage Vout and current Tout of the load. Further, the temperature detection unit 130 for detecting the temperatures of the switching elements S1 to S4 is provided.

When the switching elements S1 to S4 are formed as a module, the temperature detection unit 130 may detect the temperature inside the module. When the switching elements S1 to S4 are discrete components, the temperature detection unit 130 may detect the temperature of a heatsink, a mounting substrate, a bus bar, or the like.

In the following description, it is assumed that the temperatures of all the switching elements S1 to S4 are detected. However, the temperature of one or some of the switching elements may be detected as a representative.

The control unit 110 includes the duty calculator 21, a turn-on phase calculator 122, and the PWM calculator 23.

As described below, a difference between the control unit 110 and the control unit 10 of embodiment 1 is the turn-on phase calculator 122.

First, the turn-on phase calculator 122 will be described. FIG. 12 shows a block diagram of the turn-on phase calculator 122. The turn-on phase calculator 122 includes a carrier phase calculator 221A, a multiplier 225, and an adder/subtractor 226. In FIG. 12, a signal from the temperature detection unit 130 is denoted by Tmp.

The temperature detection unit 130 detects the temperatures of the switching elements S1 to S4, and outputs the detected temperatures to the turn-on phase calculator 122.

As in embodiment 1, the turn-on phase calculator 122 calculates the turn-on phase range on the basis of the duty D which is a calculation result from the duty calculator 21 and the switching cycle Ts, and calculates a carrier CarA synchronized with the reference carrier CarS within the turn-on phase range and a carrier CarB having a phase difference from the reference carrier CarS within the turn-on phase range. For the carrier CarB having a phase difference from the reference carrier CarS within the turn-on phase range, the carrier phase calculator 221A calculates the turn-on phase.

The carrier phase calculator 221A periodically performs sweeping of the turn-on phase within the turn-on phase range, for the carrier CarB. That is, for example, T1 (first power non-transmission period) is increased from 0 to (Ts-2 Ton).

The carrier phase calculator 221A stores a result of temperature detection at each turn-on phase, and selects the phase of the carrier CarB at which the temperature detection result is minimized.

Regarding the storage of the temperature detection result, a temperature detection result for each turn-on phase may be stored, or only data corresponding to the minimum temperature may be stored.

To adapt to change in the operation condition of the power conversion device 100, sweeping of increasing T1 (first power non-transmission period) from 0 to (Ts-2 Ton) is periodically performed. Further, when one or a plurality of voltages and currents detected by the input detection unit 8 and the output detection unit 9 exceed a predetermined threshold value, sweeping of increasing T1 from 0 to (Ts-2 Ton) is started, whereby it is possible to more immediately adapt to change in the operation condition of the power conversion device 100.

Next, searching by hill climbing will be described.

It is also possible to, by hill climbing, search for the turn-on phase at which the temperature detection result is minimized, to determine the phase of the carrier CarB.

In using hill climbing, if the initial value of time t2 is set to be equal to time t1, i.e., T1 is set at 0, it becomes possible to perform turn-on operation in a state in which the resonance amplitude is great, i.e., at a lower voltage. Thus, turn-on loss in the switching elements S2, S3 can be more effectively reduced.

By using the hill climbing, it becomes unnecessary to periodically perform sweeping of increasing T1 (first power non-transmission period) from 0 to (Ts-2 Ton) to search for the minimum value of the temperatures of the switching elements S1 to S4. Therefore, it is possible to continue operation under the operation condition that minimizes the temperatures at all times.

When response of detection for the temperatures of the switching elements S1 to S4 is slower as compared with change in voltage/current of the switching elements, a waiting time until the temperatures are saturated may be provided.

In the power conversion device according to the present embodiment 2, the turn-on phase can be adjusted on the basis of the temperatures. Therefore, it is not necessary to perform adjustment in consideration of individual variations in the leakage inductance and the parasitic capacitance of the transformer and the parasitic capacitances of the switching elements.

The searching for the turn-on phase that minimizes turn-on loss in the switching elements on the basis of the temperature detection values about the switching elements in the present embodiment 2 is also applicable to the power conversion device in which a center point is provided to the secondary winding of the transformer and the rectification circuit 6 has a center-tap configuration.

As described above, in the power conversion device according to the present embodiment 2, the temperature detection unit for the switching elements is provided, and on the basis of the temperature detection values about the switching elements, the turn-on phases for the switching elements are changed to search for a point where the temperatures of the switching elements are minimized, whereby it is possible to search for the turn-on phases for the switching elements that minimize turn-on loss in the switching elements. Therefore, as in the power conversion device according to embodiment 1, increase in switching loss is suppressed by a simple control method, whereby the controller and the cooling device can be downsized and thus a small-sized power conversion device can be provided.

Embodiment 3

A power conversion device according to embodiment 3 is configured such that, on the basis of a detection value from the input detection unit or the output detection unit, the turn-on phase for the switching elements is changed to search for a point where the input current detected by the input detection unit is minimized, thereby searching for the turn-on phase for the switching elements that minimizes turn-on loss in the switching elements.

Figure 13:
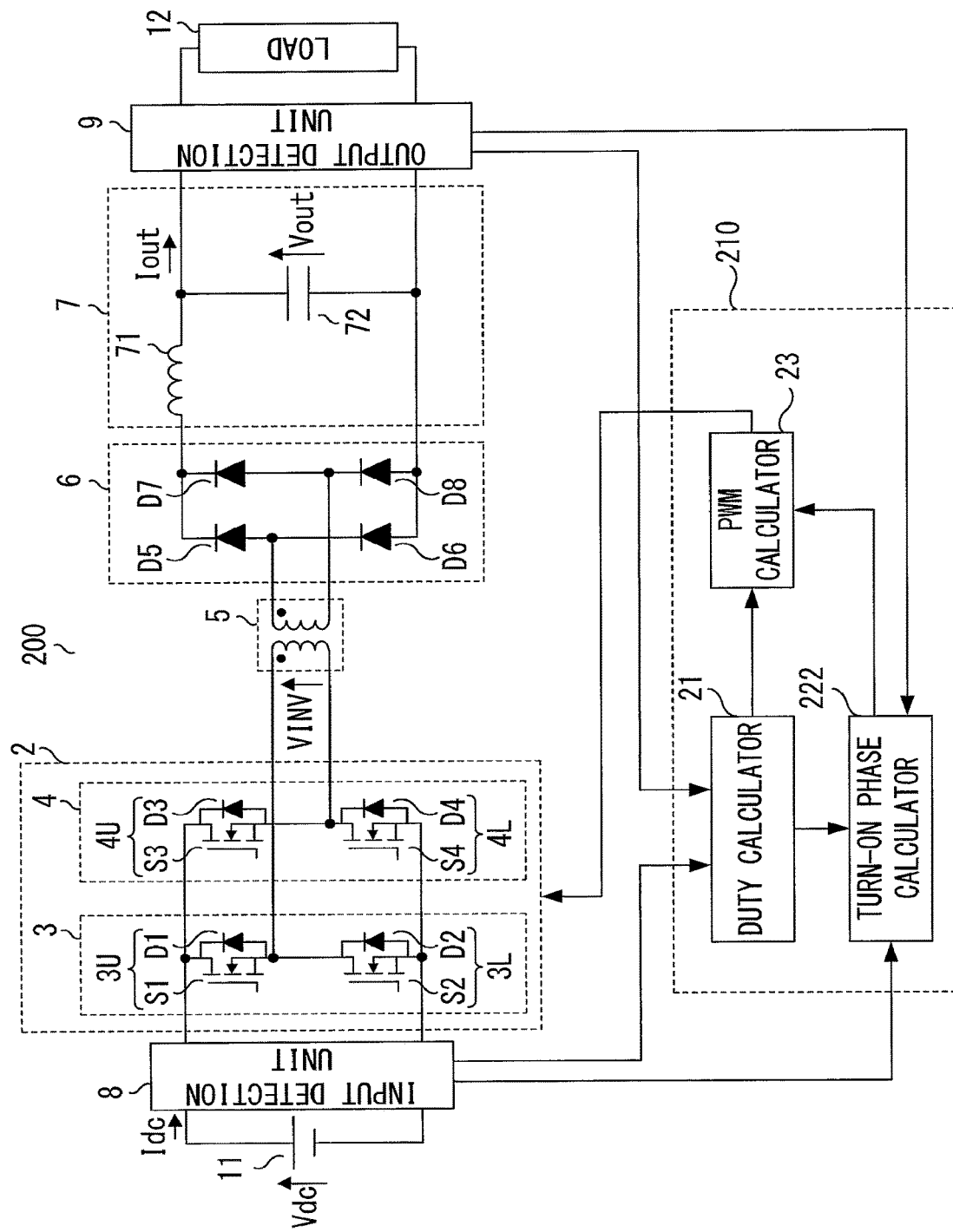
FIG. 13 is a configuration diagram of a power conversion device according to embodiment 3 of the present invention.
Figure 14:
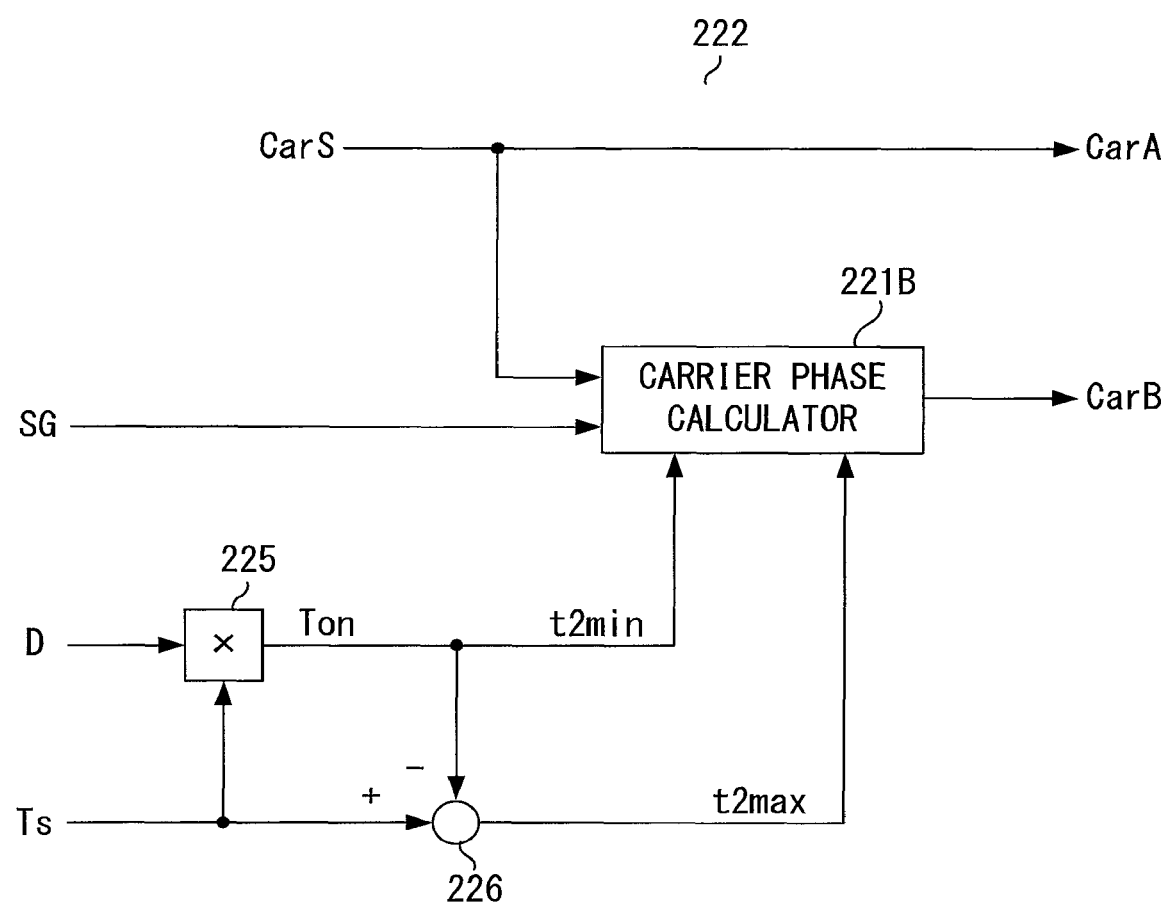
FIG. 14 is a block diagram showing the configuration of a control unit (turn-on phase calculator) in the power conversion device according to embodiment 3 of the present invention.
Figure 15:
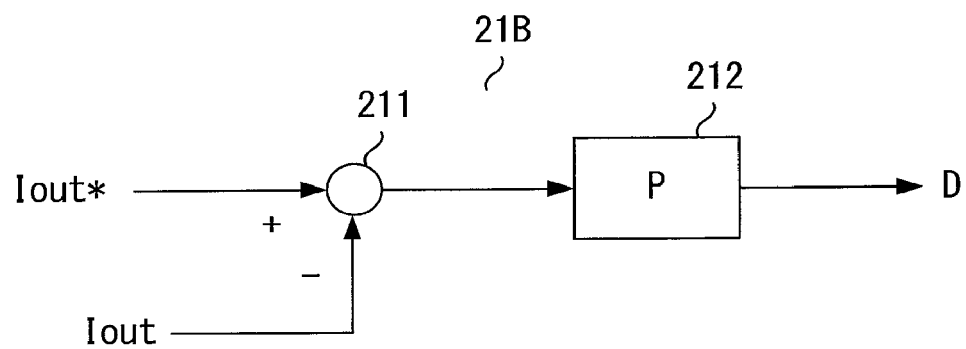
FIG. 15 is a block diagram showing the configuration of the control unit (duty calculator) in the power conversion device according to embodiment 3 of the present invention.

Hereinafter, the power conversion device according to embodiment 3 will be described, focusing on differences from embodiment 2, with reference to FIG. 13 which is a configuration diagram of the power conversion device, FIG. 14 which is a block diagram showing the configuration of a control unit (turn-on phase calculator), and FIG. 15 which is a block diagram showing the configuration of the control unit (duty calculator). In FIG. 13 to FIG. 15, parts that are the same as or correspond to those in the drawings in embodiments 1 and 2 are denoted by the same reference characters.

First, the configuration of a power conversion device 200 according to embodiment 3 will be described with reference to FIG. 13.

In FIG. 13, the power conversion device 200 is roughly composed of a power conversion unit and a detection/control unit.

The power conversion unit includes the inverter 2 having a full-bridge configuration, the transformer 5, the rectification circuit 6, and the output smoothing filter 7.

The DC power supply 11 is connected to the input side of the inverter 2 of the power conversion unit, and the load 12 is connected to the output side of the output smoothing filter 7.

The detection/control unit includes the input detection unit 8, the output detection unit 9, and a control unit 210.

First, the entire function and operation of the power conversion unit will be described.

The inverter 2 converts DC voltage of the DC power supply 11 to high-frequency AC voltage, and outputs the high-frequency AC voltage to the transformer 5. The transformer 5 keeps isolation between the inverter 2 and the rectification circuit 6, and performs conversion to predetermined high-frequency AC voltage. The rectification circuit 6 rectifies the high-frequency AC voltage outputted from the transformer 5. The output smoothing filter 7 removes a high-frequency component of the voltage outputted from the rectification circuit 6, and supplies DC power to the load 12.

In embodiment 3, the configuration and the operation of the inverter 2 of the power conversion unit in the power conversion device 200 are the same as those in embodiment 2.

Differences from embodiment 2, i.e., differences in the configuration and the operation of the detection/control unit in the power conversion device 200, will be mainly described.

The power conversion device 200 according to embodiment 3 includes the input detection unit 8 and the output detection unit 9 as detection units.

As in embodiment 2, in the power conversion device 200, the input detection unit 8 is provided in parallel to the DC power supply 11, and detects at least one of voltage Vdc and current Idc of the DC power supply 11. In addition, the output detection unit 9 is provided in parallel to the load 12, and detects at least one of voltage Vout and current Iout of the load.

The control unit 210 includes the duty calculator 21, a turn-on phase calculator 222, and the PWM calculator 23. As described below, a difference between the control unit 210 and the control unit 110 of embodiment 2 is the turn-on phase calculator 222.

In the power conversion device 100 according to embodiment 2, the temperatures of the switching elements S1 to S4 detected by the temperature detection unit 130 are outputted to the turn-on phase calculator 122. In contrast, in the power conversion device 200 according to embodiment 3, the voltage/current value detected by the input detection unit 8 or the output detection unit 9 is outputted also to the turn-on phase calculator 222.

First, the turn-on phase calculator 222 will be described. FIG. 14 shows a block diagram of the turn-on phase calculator 222. The turn-on phase calculator 222 includes a carrier phase calculator 221B, a multiplier 225, and an adder/subtractor 226. In FIG. 14, a signal from the input detection unit 8 or the output detection unit 9 is denoted by SG.

As in embodiment 2, the turn-on phase calculator 222 calculates the turn-on phase range on the basis of the duty D which is a calculation result from the duty calculator 21 and the switching cycle Ts, and calculates a carrier CarA synchronized with the reference carrier CarS within the turn-on phase range and a carrier CarB having a phase difference from the reference carrier CarS within the turn-on phase range. For the carrier CarB having a phase difference from the reference carrier CarS within the turn-on phase range, a carrier phase calculator 221B calculates the turn-on phase.

When a voltage source is on the input side and a voltage source load such as a battery is on the output side, output power is determined through control of the output current amount. Therefore, if the input current becomes small, switching loss is reduced.

In this case, searching for a point where the input current detection value is minimized is performed using the input current detection value detected by the input detection unit 8.

In the following description, it is assumed that a voltage source is on the input side and a voltage source load such as a battery is on the output side.

A duty calculator 21B shown in FIG. 15 calculates the duty D on the basis of a deviation between an output current detection value Iout of the output detection unit 9 and a load current target value Iout*.

At this time, the turn-on phase calculator 222 controls the turn-on phase and searches for a point where the input current is minimized, on the basis of the input current detection value of the input detection unit 8.

The carrier phase calculator 221B periodically performs sweeping of the turn-on phase within the turn-on phase range, for the carrier CarB. That is, for example, T1 (first power non-transmission period) is increased from 0 to (Ts-2 Ton).

The input current detection value at each turn-on phase is stored and the phase of the carrier CarB at which the input current detection value is minimized is selected.

Regarding the storage of the search result, the input current detection value for each turn-on phase may be stored, or only turn-on phase data corresponding to the minimum input current may be stored.

To adapt to change in the operation condition of the power conversion device 200, sweeping of increasing T1 (first power non-transmission period) from 0 to (Ts-2 Ton) is periodically performed. Further, when one or a plurality of voltages and currents detected by the input detection unit 8 and the output detection unit 9 exceed a predetermined threshold value, sweeping of increasing T1 from 0 to (Ts-2 Ton) is started, whereby it is possible to more immediately adapt to change in the operation condition of the power conversion device 100.

Next, searching by hill climbing will be described.

It is also possible to, by hill climbing, search for the turn-on phase at which the input current detection value is minimized, to determine the phase of the carrier CarB.

In using hill climbing, if the initial value of time t2 is set to be equal to time t1, i.e., T1 is set at 0, it becomes possible to perform turn-on operation in a state in which the resonance amplitude is great, i.e., at a lower voltage. Thus, searching for the minimum value of the input current detection value can be more effectively performed.

By using the hill climbing, it becomes unnecessary to periodically perform sweeping of increasing T1 (first power non-transmission period) from 0 to (Ts-2 Ton) to search for the minimum value of the input current detection value. Therefore, it is possible to continue operation under the operation condition that minimizes the input current detection value at all times.

In the above description, the power conversion device 200 according to embodiment 3 has been described using the case where a voltage source is on the input side and a voltage source load such as a battery is on the output side.

When the DC power supply 11 is a constant power source such as an AC/DC converter and a voltage source load such as a battery is on the output side, if the output current becomes great, switching loss is reduced.

In this case, on the basis of the output current detection value outputted from the output detection unit 9 to the carrier phase calculator 221B, searching for the maximum value of the output current detection value is performed, whereby it is possible to search for a point that minimizes switching loss in the switching elements S1 to S4.

In the power conversion device according to the present embodiment 3, it is possible to search for a point that minimizes switching loss in the switching elements, on the basis of the input current detection value, for example. Therefore, it is not necessary to perform adjustment in consideration of individual variations in the leakage inductance and the parasitic capacitance of the transformer and the parasitic capacitances of the switching elements.

As described above, in the power conversion device according to embodiment 3, on the basis of the detection value of the input detection unit or the output detection unit, the turn-on phase for the switching elements is changed to search for a point where the detection input current of the input detection unit is minimized, thereby searching for the turn-on phase for the switching elements that minimizes turn-on loss in the switching elements. Therefore, as in the power conversion device according to embodiment 1, increase in switching loss is suppressed by a simple control method, whereby the controller and the cooling device can be downsized and thus a small-sized power conversion device can be provided.

Embodiment 4

A power conversion device according to embodiment 4 is configured by providing a high-pass filter to the turn-on phase calculator to remove temperature change due to increase in battery voltage and detect only temperature change due to resonant oscillation in using a large-capacity battery as a load in embodiment 2.

Figure 16:
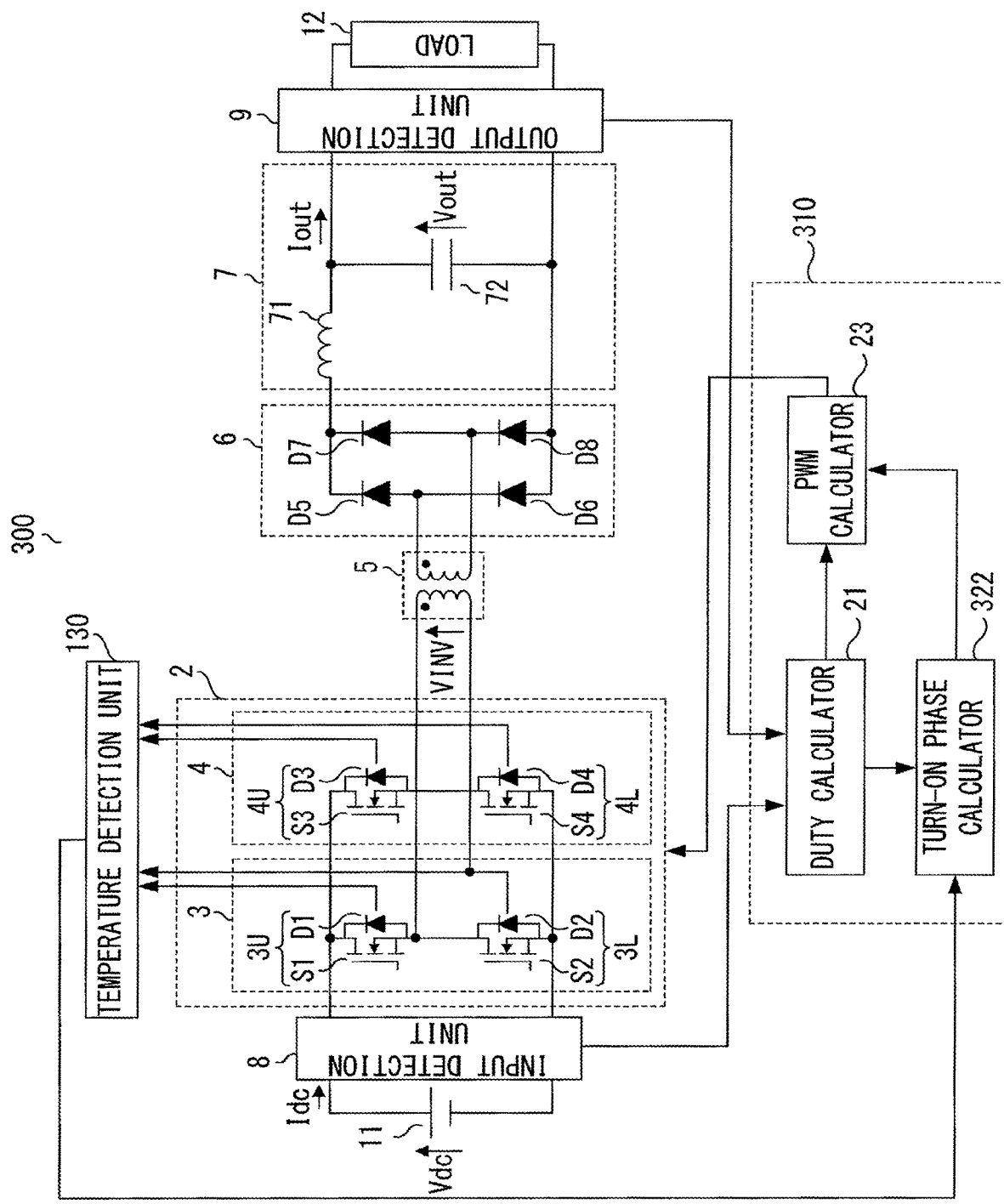
FIG. 16 is a configuration diagram of a power conversion device according to embodiment 4 of the present invention.
Figure 17:
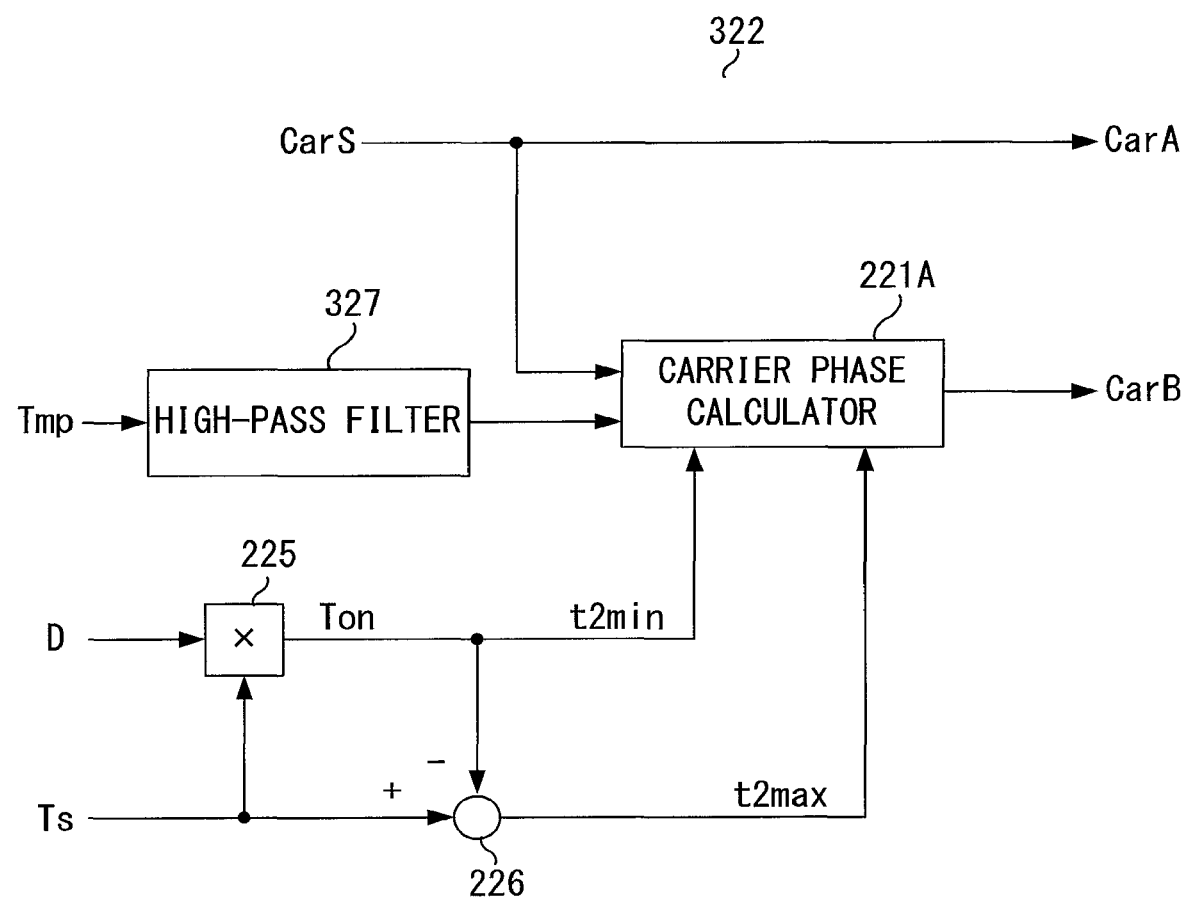
FIG. 17 is a block diagram showing the configuration of a control unit (turn-on phase calculator) in the power conversion device according to embodiment 4 of the present invention.

Hereinafter, the power conversion device according to embodiment 4 will be described, focusing on differences from embodiment 2, with reference to FIG. 16 which is a configuration diagram of the power conversion device and FIG. 17 which is a block diagram showing the configuration of a control unit (turn-on phase calculator). In FIG. 16 and FIG. 17, parts that are the same as or correspond to those in the drawings in embodiments 1 and 2 are denoted by the same reference characters.

First, the configuration of a power conversion device 300 according to embodiment 4 will be described with reference to FIG. 16.

In FIG. 16, the power conversion device 300 is roughly composed of a power conversion unit and a detection/control unit.

The power conversion unit includes the inverter 2 having a full-bridge configuration, the transformer 5, the rectification circuit 6, and the output smoothing filter 7. The DC power supply 11 is connected to the input side of the inverter 2 of the power conversion unit, and the load 12 is connected to the output side of the output smoothing filter 7.

The detection/control unit includes the input detection unit 8, the output detection unit 9, and a control unit 310.

In embodiment 4, the configuration and the operation of the inverter 2 of the power conversion unit in the power conversion device 300 are the same as those in embodiment 2.

Differences from embodiment 2, i.e., differences in the configuration and the operation of the detection/control unit in the power conversion device 300, will be mainly described.

The power conversion device 300 according to embodiment 4 includes the input detection unit 8, the output detection unit 9, and the temperature detection unit 130 as detection units.

As in embodiment 2, in the power conversion device 300, the input detection unit 8 is provided in parallel to the DC power supply 11, and detects at least one of voltage Vdc and current Idc of the DC power supply 11. In addition, the output detection unit 9 is provided in parallel to the load 12, and detects at least one of voltage Vout and current Iout of the load. Further, the temperature detection unit 130 for detecting the temperatures of the switching elements S1 to S4 is provided.

The control unit 310 includes the duty calculator 21, a turn-on phase calculator 322, and the PWM calculator 23. As described below, a difference between the control unit 310 and the control unit 210 of embodiment 2 is the turn-on phase calculator 322.

First, the turn-on phase calculator 322 will be described. FIG. 17 shows a block diagram of the turn-on phase calculator 322. The turn-on phase calculator 322 includes the carrier phase calculator 221A, the multiplier 225, the adder/subtractor 226, and a high-pass filter 327. In FIG. 17, a signal from the temperature detection unit 130 is denoted by Tmp.

The temperature detection unit 130 detects the temperatures of the switching elements S1 to S4 and outputs the temperatures to the turn-on phase calculator 322. However, unlike embodiment 2, the signal (Tmp) from the temperature detection unit 130 is inputted to the carrier phase calculator 221A via the high-pass filter 327.

As in embodiment 2, the turn-on phase calculator 322 calculates the turn-on phase range on the basis of the duty D which is a calculation result from the duty calculator 21 and the switching cycle Ts, and calculates a carrier CarA synchronized with the reference carrier CarS within the turn-on phase range, and a carrier CarB having a phase difference from the reference carrier CarS within the turn-on phase range. For the carrier CarB having a phase difference from the reference carrier CarS within the turn-on phase range, the carrier phase calculator 221A calculates a turn-on phase.

The carrier phase calculator 221A periodically performs sweeping of the turn-on phase within the turn-on phase range, for the carrier CarB. That is, for example, T1 (first power non-transmission period) is increased from 0 to (Ts-2 Ton).

The carrier phase calculator 221A stores a temperature detection result that has passed through the high-pass filter 327, for each turn-on phase, and selects the phase of the carrier CarB at which the temperature detection result is minimized.

Regarding the storage of the temperature detection result that has passed through the high-pass filter 327, a temperature detection result for each turn-on phase may be stored, or only data corresponding to the minimum temperature may be stored.

Thus, in embodiment 4, as shown in FIG. 17, a detection result of the temperatures of the switching elements S1 to S4 detected by the temperature detection unit 130 is inputted to the carrier phase calculator 221A via the high-pass filter circuit 327. On the basis of the input result, the turn-on phase for the switch elements is changed as in embodiment 2, to control the lengths of the first power non-transmission period and the second power non-transmission period.

Next, the reason why the high-pass filter circuit 327 is provided to the turn-on phase calculator 322 will be described.

For a power conversion device to which a large-capacity battery such as an on-vehicle charger mounted to an electric vehicle (EV), plug-in hybrid electric vehicle (PHEV), or the like is applied as a load, as the voltage of the battery gradually increases, the temperatures of the switching elements also gradually change. In contrast, resonant oscillation during the power non-transmission period has a high frequency at MHz level, and the time constant of temperature change is shorter as compared with the time constant of temperature change due to change in battery voltage.

The high-pass filter circuit 327 newly provided in the present embodiment 4 makes it possible to remove temperature change due to battery voltage increase and detect only temperature change due to resonant oscillation. Therefore, it is possible to search for a point that minimizes switching loss, with high accuracy.

As described above, the power conversion device according to embodiment 4 is configured such that a high-pass filter is provided to the turn-on phase calculator to remove temperature change due to battery voltage increase and detect only temperature change due to resonant oscillation, when a large-capacity battery is used as a load. Therefore, as in the power conversion device according to embodiment 1, increase in switching loss is suppressed by a simple control method, whereby the controller and the cooling device can be downsized and thus a small-sized power conversion device can be provided. Further, it is possible to search for a point that minimizes switching loss, with enhanced accuracy.

Embodiment 5

A power conversion device according to embodiment 5 is configured such that capacitors are added in parallel to the switching elements of the inverter in the power conversion unit or an inductor is added to the primary winding of the transformer in order to ease searching for a point that minimizes switching loss, as compared to embodiments 2 to 4.

Figure 18:
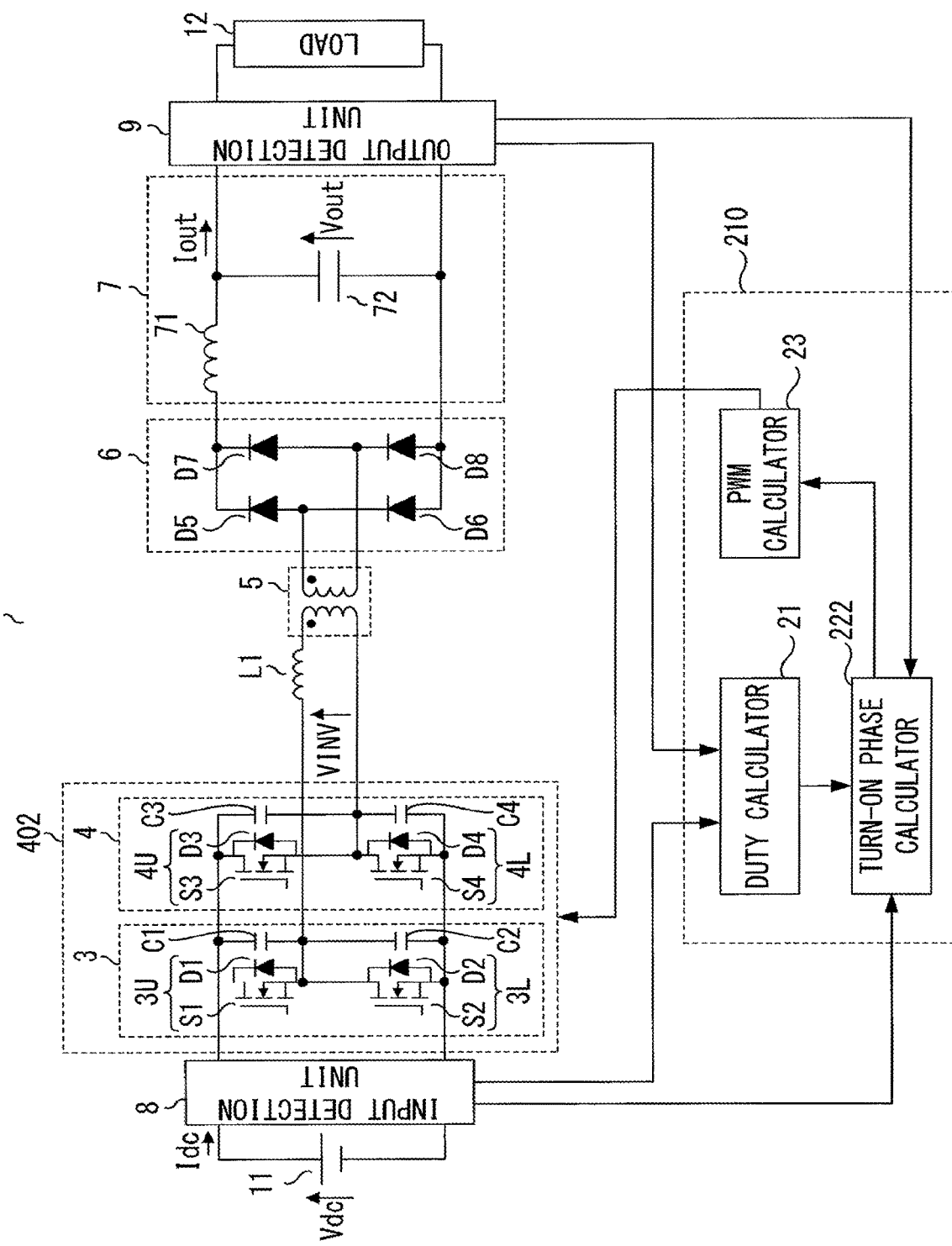
FIG. 18 is a configuration diagram of a power conversion device according to embodiment 5 of the present invention.

Hereinafter, the power conversion device according to embodiment 5 applying to the power conversion device according to embodiment 3 as an example will be described, focusing on differences from embodiment 3, with reference to FIG. 18 which is a configuration diagram of the power conversion device. In FIG. 18, parts that are the same as or correspond to those in the drawings in embodiments 1 and 3 are denoted by the same reference characters.

First, the configuration of a power conversion device 400 according to embodiment 5 will be described with reference to FIG. 18.

In FIG. 18, a power conversion device 400 is roughly composed of a power conversion unit and a detection/control unit.

The power conversion unit includes an inverter 402 having a full-bridge configuration, the transformer 5, the rectification circuit 6, the output smoothing filter 7, and an inductor L1 connected in series to the primary winding of the transformer 5. The DC power supply 11 is connected to the input side of the inverter 402 of the power conversion unit, and the load 12 is connected to the output side of the output smoothing filter 7.

The detection/control unit includes the input detection unit 8, the output detection unit 9, and the control unit 210.

In embodiment 5, the basic configuration and operation of the inverter 402 of the power conversion unit in the power conversion device 500 are the same as those in embodiment 3.

Differences from embodiment 3, i.e., the functions of the capacitors C1 to C4 connected in parallel to the switching elements S1 to S4 of the inverter 402 and the inductor L1 provided in series to the primary winding of the transformer 5, will be mainly described.

Connecting the capacitors C1 to C4 in parallel to the switching elements S1 to S4 of the inverter 402 and connecting the inductor L1 in series to the primary winding of the transformer 5 enables reduction of the frequency of resonant oscillation occurring during the first power non-transmission period and the second power non-transmission period, thereby easing searching for a point that minimizes switching loss.

Only either the capacitors C1 to C4 or the inductor L1 may be added. Instead of adding all the capacitors C1 to C4, a capacitor may be connected in parallel to one or more of the switching elements S1 to S4. For example, capacitors may be added to the switching elements of the upper arms (3U, 4U) or the lower arms (3L, 4L). Alternatively, capacitors may be added to the switching elements of the first leg 3 or the second leg 4. Still alternatively, capacitors may be added to only a diagonal pair of elements, i.e., the switching elements S1 and S4 or the switching elements S2 and S3. The inductor L1 may be connected in series to the secondary winding of the transformer 5, or may be provided on both of the primary side and the secondary side.

In the above description, the example in which capacitors and an inductor are added to the power conversion device in embodiment 3 has been described. However, the above configuration can be applied also to the power conversion devices of embodiments 2 and 4 in the same manner.

As described above, the power conversion device according to embodiment 5 is configured such that capacitors are added in parallel to the switching elements of the inverter of the power conversion unit or an inductor is added to the primary winding of the transformer. Therefore, as in the power conversion device according to embodiment 1, increase in switching loss is suppressed by a simple control method, whereby the controller and the cooling device can be downsized and thus a small-sized power conversion device can be provided. Further, it is possible to facilitate searching for a point that minimizes switching loss.

It is noted that, within the scope of the present invention, the above embodiments may be freely combined with each other, or each of the above embodiments may be modified or simplified as appropriate.

INDUSTRIAL APPLICABILITY

The present invention enables size reduction of the controller and the cooling device by suppressing increase in switching loss by a simple control method, and therefore is widely applicable to power conversion devices.

DESCRIPTION OF THE REFERENCE CHARACTERS 1, 1A, 100, 200, 300, 400 power conversion device
2, 402 inverter
3 first leg
4 second leg
5, 5A transformer
6, 6A rectification circuit
7 output smoothing filter
8 input detection unit
9 output detection unit
10, 110, 210, 310 control unit
11 DC power supply
12 load
21, 21A, 21B, 21C duty calculator
22, 122, 222, 322 turn-on phase calculator
23 PWM calculator
71, L1 inductor
72, C1 to C4 capacitor
211, 214 adder/subtractor
212 proportional controller
213 proportional integral controller
215 proportional controller
231, 232 comparator
225 multiplier
226 adder/subtractor
233 AND gate
234 delay device
327 high-pass filter
3U, 4U upper arm
3L, 4L lower arm
S1 to S4 switching element
D1 to D4 feedback diode
D5 to D10 diode

The invention claimed is:

1. A power conversion device comprising:
an inverter having a full-bridge configuration, in which a first leg and a second leg are connected in parallel and are each formed by connecting, in series, switching elements forming an upper arm and a lower arm, the first leg and the second leg are connected in parallel to a DC power supply, and a connection point between the upper arm and the lower arm of the first leg and a connection point between the upper arm and the lower arm of the second leg serve as output terminals for AC voltage;
a transformer having a primary side connected to the output terminals for the AC voltage;
a rectification circuit connected to a secondary side of the transformer; and
controlling circuitry for turning on/off each of the switching elements, wherein
the controlling circuitry alternately provides a first power transmission period in which the switching element of the upper arm of the first leg and the switching element of the lower arm of the second leg in the inverter are turned on at the same time, and a second power transmission period in which the switching element of the lower arm of the first leg and the switching element of the upper arm of the second leg in the inverter are turned on at the same time,
the controlling circuitry provides a first power non-transmission period in which all the switching elements are turned off, between the first power transmission period and the second power transmission period, and provides a second power non-transmission period in which all the switching elements are turned off, between the second power transmission period and the first power transmission period,
the controlling circuitry performs control so as to change a length of the first power non-transmission period and a length of the second power non-transmission period every switching cycle, while setting a total length of the first power non-transmission period and the second power non-transmission period to be constant, and
a temperature detector for detecting a temperature of at least one of the switching elements included in the inverter,
wherein on the basis of a detection signal from the temperature detector, the controlling circuitry controls the start phase of the first power non-transmission period or the second power non-transmission period so that the temperature of the at least one of the switching elements is minimized, wherein the controlling circuitry has a high-pass filter circuit for the detection signal from the temperature detector, and on the basis of an output result from the high-pass filter circuit, the controlling circuitry controls the start phase of the first power non-transmission period or the second power non-transmission period so that the temperature of the at least one of the switching elements is minimized.

2. The power conversion device according to claim 1, further comprising a detection circuit for detecting at least one of voltage and current on at least one of an input side of the inverter and an output side of the rectification circuit, wherein the controlling circuitry controls the length of the first power non-transmission period and the length of the second power non-transmission period on the basis of the switching cycle, a detection value of at least one of the voltage and the current detected by the detection circuit, and a predetermined target value for the detection value.

3. The power conversion device according to claim 1, wherein the predetermined unit time is constant in respective switching cycles.

4. The power conversion device according to claim 1, wherein each of the switching elements is in parallel with a diode.

5. The power conversion device according to claim 1, wherein the predetermined period is a dead time.

6. A power conversion device comprising:
an inverter having a full-bridge configuration, in which a first leg and a second leg are connected in parallel and are each formed by connecting, in series, switching elements forming an upper arm and a lower arm, the first leg and the second leg are connected in parallel to a DC power supply, and a connection point between the upper arm and the lower arm of the first leg and a connection point between the upper arm and the lower arm of the second leg serve as output terminals for AC voltage, a transformer having a primary side connected to the output terminals for the AC voltage; and controlling circuitry for turning on/off each of the switching elements, wherein the controlling circuitry alternately provides a first power transmission period in which the switching element of the upper arm of the first leg and the switching element of the lower arm of the second leg in the inverter are turned on at the same time, and a second power transmission period in which the switching element of the lower arm of the first leg and the switching element of the upper arm of the second leg in the inverter are turned on at the same time, the controlling circuitry provides a first power non-transmission period in which all the switching elements are turned off, between the first power transmission period and the second power transmission period, and provides a second power non-transmission period in which all the switching elements are turned off, between the second power transmission period and the first power transmission period, the controlling circuitry performs control so as to change a length of the first power non-transmission period and a length of the second power non-transmission period every switching cycle, while setting a total length of the first power non-transmission period and the second power non-transmission period to be constant, and a temperature detector for detecting a temperature of at least one of the switching elements included in the inverter, wherein on the basis of a detection signal from the temperature detector, the controlling circuitry controls the start phase of the first power non-transmission period or the second power non-transmission period so that the temperature of the at least one of the switching elements is minimized, and wherein the controlling circuitry has a high-pass filter circuit for the detection signal from the temperature detector, and on the basis of an output result from the high-pass filter circuit, the controlling circuitry controls the start phase of the first power non-transmission period or the second power non-transmission period so that the temperature of the at least one of the switching elements is minimized.

7. The power conversion device according to claim 6, further comprising a detection circuit for detecting at least one of voltage and current on at least one of an input side of the inverter and a secondary side of the transformer, wherein the controlling circuitry controls the length of the first power non-transmission period and the length of the second power non-transmission period on the basis of the switching cycle, a detection value of at least one of the voltage and the current detected by the detection circuit, and a predetermined target value for the detection value.

8. The power conversion device according to claim 6, wherein the predetermined period is a dead time.

9. A power conversion device comprising:
an inverter having a full-bridge configuration, in which a first leg and a second leg are connected in parallel and are each formed by connecting, in series, switching elements forming an upper arm and a lower arm, the first leg and the second leg are connected in parallel to a DC power supply, and a connection point between the upper arm and the lower arm of the first leg and a connection point between the upper arm and the lower arm of the second leg serve as output terminals for AC voltage;

a transformer having a primary side connected to the output terminals for the AC voltage;

a rectification circuit connected to a secondary side of the transformer; and controlling circuitry for turning on/off each of the switching elements, wherein the controlling circuitry alternately provides a first power transmission period in which the switching element of the upper arm of the first leg and the switching element of the lower arm of the second leg in the inverter are turned on at the same time, and a second power transmission period in which the switching element of the lower arm of the first leg and the switching element of the upper arm of the second leg in the inverter are turned on at the same time, the controlling circuitry provides a first power non-transmission period in which all the switching elements are turned off, between the first power transmission period and the second power transmission period, and provides a second power non-transmission period in which all the switching elements are turned off, between the second power transmission period and the first power transmission period, the controlling circuitry performs control so as to change a length of the first power non-transmission period and a length of the second power non-transmission period every switching cycle, while setting a total length of the first power non-transmission period and the second power non-transmission period to be constant, the controlling circuitry calculates a start phase of one of the first power non-transmission period and the second power non-transmission period, controls the length of the first power non-transmission period or the second power non-transmission period while setting the total length of the first power non-transmission period and the second power non-transmission period to be constant, searches for a point that minimizes loss in the switching elements, and performs operation at the point that minimizes the loss, the controlling circuitry performs control to change the length of the first power non-transmission period or the second power non-transmission period by a predetermined unit time, and the unit time is shorter than a cycle of a resonant voltage waveform occurring on drain-source voltage of each switching element, a temperature detector for detecting a temperature of at least one of the switching elements included in the inverter, wherein on the basis of a detection signal from the temperature detector, the controlling circuitry controls the start phase of the first power non-transmission period or the second power non-transmission period so that the temperature of the at least one of the switching elements is minimized, and wherein the controlling circuitry has a high-pass filter circuit for the detection signal from the temperature detector, and on the basis of an output result from the high-pass filter circuit, the controlling circuitry controls the start phase of the first power non-transmission period or the second power non-transmission period so that the temperature of the at least one of the switching elements is minimized.

10. The power conversion device according to claim 9, wherein the controlling circuitry controls the start phase of one of the first power non-transmission period and the second power non-transmission period so as to increase the one of the first power non-transmission period and the second power non-transmission period from zero or the length of the dead time, and searches for the point that minimizes the loss in the switching elements, by hill climbing.

11. The power conversion device according to claim 9, wherein on the basis of a detection signal from a detection circuit for detecting input current on an input side of the inverter, the controlling circuitry controls the start phase of the first power non-transmission period or the second power non-transmission period so that the input current is minimized.

12. The power conversion device according to claim 9, wherein on the basis of a detection signal from a detection circuit for detecting output current on an output side of the inverter, the controlling circuitry controls the start phase of the first power non-transmission period or the second power non-transmission period so that the output current is maximized.

13. The power conversion device according to claim 9, wherein a capacitor is provided in parallel to at least one of the switching elements.

14. The power conversion device according to claim 9, wherein an inductor is provided in series to one or both of a primary winding and a secondary winding of the transformer.

* * * * *